(12) United States Patent
Foster et al.

(10) Patent No.: US 12,264,671 B2
(45) Date of Patent: *Apr. 1, 2025

(54) MANIFOLD ASSEMBLY

(71) Applicant: Kerr Machine Co., Sulphur, OK (US)

(72) Inventors: Kelcy Jake Foster, Sulphur, OK (US); Micheal Cole Thomas, Ardmore, OK (US); Christopher Todd Barnett, Stratford, OK (US); John Keith, Ardmore, OK (US); Nicholas Son, Davis, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,837

(22) Filed: Apr. 22, 2024

(65) Prior Publication Data

US 2024/0271617 A1     Aug. 15, 2024

Related U.S. Application Data

(63) Continuation of application No. 18/166,581, filed on Feb. 9, 2023, now Pat. No. 11,965,504.

(60) Provisional application No. 63/309,168, filed on Feb. 11, 2022.

(51) Int. Cl.
| | |
|---|---|
| *F04B 53/22* | (2006.01) |
| *F04B 1/053* | (2020.01) |
| *F04B 15/02* | (2006.01) |
| *F04B 47/00* | (2006.01) |
| *F04B 53/16* | (2006.01) |
| *E21B 43/26* | (2006.01) |

(52) U.S. Cl.
CPC ............. *F04B 53/22* (2013.01); *F04B 1/053* (2013.01); *F04B 15/02* (2013.01); *F04B 47/00* (2013.01); *F04B 53/16* (2013.01); *E21B 43/2607* (2020.05)

(58) Field of Classification Search
CPC .......... F04B 1/04; F04B 1/0404; F04B 1/053; F04B 15/00; F04B 15/02; F04B 17/00; F04B 17/03; F04B 17/06; F04B 23/06; F04B 47/00; F04B 53/00; F04B 53/16; F04B 53/22; E21B 43/2607
See application file for complete search history.

(56) References Cited

U.S. PATENT DOCUMENTS

| | | |
|---|---|---|
| 1,662,725 A | 3/1928 | Toney |
| 2,771,846 A | 11/1956 | Horton et al. |
| 2,957,422 A | 10/1960 | Loeber |
| 3,005,412 A | 10/1961 | Camp |
| 3,301,197 A | 1/1967 | Dodson et al. |
| 3,887,305 A | 6/1975 | Ito |

(Continued)

*Primary Examiner* — Kenneth J Hansen
*Assistant Examiner* — Chirag Jariwala
(74) *Attorney, Agent, or Firm* — Tomlinson McKinstry, P.C.

(57) ABSTRACT

A manifold assembly configured for use with a fluid end used in oil and gas operations. The manifold assembly comprises upper and lower manifolds supported on side posts such that the manifolds and posts define a central opening. In operation, the fluid end is positioned within the central opening such that the manifold assembly surrounds the fluid end. The manifold assembly is not attached to the fluid end other than flexible conduits interconnecting the fluid and the manifolds. The manifold assembly is modular and when assembled, may be moved together as a single unit.

18 Claims, 32 Drawing Sheets

(56) References Cited

U.S. PATENT DOCUMENTS

| | | |
|---|---|---|
| 4,177,016 A | 12/1979 | Aude |
| 4,388,050 A | 6/1983 | Schuller |
| 4,442,866 A * | 4/1984 | Loukonen ................. F16J 3/02 |
| | | 138/104 |
| 4,467,703 A | 8/1984 | Redwine et al. |
| 4,494,415 A | 1/1985 | Elliston |
| 4,553,298 A | 11/1985 | Grable |
| 4,566,370 A | 1/1986 | Hanafi |
| 4,616,983 A | 10/1986 | Hanafi |
| 4,773,833 A | 9/1988 | Wilkinson et al. |
| 4,778,347 A | 10/1988 | Mize |
| 5,073,096 A | 12/1991 | King et al. |
| 5,299,921 A | 4/1994 | Richter |
| 5,382,057 A | 1/1995 | Richter |
| 7,506,574 B2 | 3/2009 | Jensen et al. |
| 8,083,504 B2 | 12/2011 | Williams et al. |
| 9,243,630 B2 | 2/2016 | Foote |
| 9,791,082 B2 | 10/2017 | Baxter et al. |
| 10,184,470 B2 | 1/2019 | Barnett |
| 10,677,380 B1 | 6/2020 | Surjaatmadja et al. |
| 11,162,479 B2 | 11/2021 | Thomas et al. |
| 11,261,863 B2 | 3/2022 | Beisel et al. |
| 11,619,326 B1 * | 4/2023 | Nguyen ................. F16F 1/3842 |
| | | 166/308.1 |
| 2010/0038070 A1 | 2/2010 | Blanco et al. |
| 2011/0206546 A1 | 8/2011 | Vicars |
| 2013/0112074 A1 | 8/2013 | Small |
| 2013/0263932 A1 | 10/2013 | Baxter et al. |
| 2014/0196570 A1 | 7/2014 | Small et al. |
| 2015/0101694 A1 | 4/2015 | Forrest et al. |
| 2015/0132152 A1 | 5/2015 | Lazzara |
| 2015/0132157 A1 | 5/2015 | Whaley et al. |
| 2015/0147194 A1 | 5/2015 | Foote |
| 2015/0300332 A1 | 10/2015 | Kotapish et al. |
| 2016/0090980 A1 | 3/2016 | Howard et al. |
| 2017/0159654 A1 * | 6/2017 | Kendrick ................. F04D 13/12 |
| 2018/0363820 A1 * | 12/2018 | Lane ................... F16L 37/0841 |
| 2019/0049052 A1 | 2/2019 | Shuck |
| 2020/0182240 A1 | 6/2020 | Nowell et al. |
| 2020/0232455 A1 | 7/2020 | Blume |
| 2020/0362678 A1 | 11/2020 | Lesko |
| 2022/0018235 A1 | 1/2022 | Post et al. |
| 2022/0107039 A1 * | 4/2022 | Oehring ................. F04B 15/02 |
| 2022/0186589 A1 * | 6/2022 | Bull ....................... E21B 43/12 |
| 2022/0235754 A1 | 7/2022 | Hines et al. |

* cited by examiner

MANIFOLD ASSEMBLY

RELATED APPLICATIONS

This application is a continuation of U.S. patent application Ser. No. 18/166,581, authored by Foster et al., and filed on Feb. 9, 2023, which claims the benefit of U.S. provisional patent application Ser. No. 63/309,168, authored by Foster et al., and filed on Feb. 11, 2022, the entire contents of which are incorporated herein by reference.

SUMMARY

The present application discloses a manifold assembly comprising a frame comprising a first and second side post positioned in a spaced relationship. The manifold assembly further comprises an upper manifold supported on an upper end of the frame, and a lower manifold supported on a lower end of the frame. The first and second side posts are joined by the upper and lower manifolds such that the first and second side posts and the upper and lower manifolds define a central opening.

The frame further comprises a plurality of upper conduits attached to the upper manifold, and a plurality of lower conduits attached to the lower manifold. The plurality of upper and lower conduits are configured to be attached to a fluid end when at least a portion of the fluid end is positioned within the central opening.

BACKGROUND

Various industrial applications may require the delivery of high volumes of highly pressurized fluids. For example, hydraulic fracturing (commonly referred to as "fracking") is a well stimulation technique used in oil and gas production, in which highly pressurized fluid is injected into a cased wellbore. As shown for example in FIG. 1, the pressured fluid flows through perforations 10 in a casing 12 and creates fractures 14 in deep rock formations 16. Pressurized fluid is delivered to the casing 12 through a wellhead 18 supported on the ground surface 20. Sand or other small particles (commonly referred to as "proppants") are normally delivered with the fluid into the rock formations 16. The proppants help hold the fractures 14 open after the fluid is withdrawn. The resulting fractures 14 facilitate the extraction of oil, gas, brine, or other fluid trapped within the rock formations 16.

Fluid ends are devices used in conjunction with a power source to pressurize the fluid used during hydraulic fracturing operations. A single fracking operation may require the use of two or more fluid ends at one time. For example, six fluid ends 22 are shown operating at a wellsite 24 in FIG. 2. Each of the fluid ends 22 is attached to a power end 26 in a one-to-one relationship. The power end 26 serves as an engine or motor for the fluid end 22. Together, the fluid end 22 and power end 26 function as a high-pressure pump.

Continuing with FIG. 2, a single fluid end 22 and its corresponding power end 26 are typically positioned on a truck bed 28 at the wellsite 24 so that they may be easily moved, as needed. The fluid and proppant mixture to be pressurized is normally held in large tanks 30 at the wellsite 24. An intake piping system 32 delivers the fluid and proppant mixture from the tanks 30 to each fluid end 22. A discharge piping system 33 transfers the pressurized fluid from each fluid end 22 to the wellhead 18, where it is delivered into the casing 12 shown in FIG. 1.

Fluid ends operate under notoriously extreme conditions, enduring the same pressures, vibrations, and abrasives that are needed to fracture the deep rock formations 16, shown in FIG. 1. Fluid ends may operate at pressures of 5,000-15,000 pounds per square inch (psi) or greater. Fluid used in hydraulic fracturing operations is typically pumped through the fluid end at a pressure of at least 8,000 psi, and more typically between 10,000 and 15,000 psi. However, the pressure may reach up to 22,500 psi.

The power end used with the fluid end typically has a power output of at least 2,250 horsepower during hydraulic fracturing operations. A single fluid end typically produces a fluid volume of about 400 gallons, or 10 barrels, per minute during a fracking operation. A single fluid end may operate in flow ranges from 170 to 630 gallons per minute, or approximately 4 to 15 barrels per minute. When a plurality of fluid ends are used together, the fluid ends collectively may deliver as much as 4,200 gallons per minute or 100 barrels per minute to the wellbore.

Turning to FIG. 3, one embodiment of a pump 40 known in the art is shown. The pump 40 comprises a fluid end 42 attached to a power end 44. Upper and lower intake or suction manifolds 46 and 48 are attached to the fluid end 42 using a plurality of rigid suction conduits 50. In operation, the intake piping system 32 shown in FIG. 2 is attached to the suction manifolds 46 and 48. Fluid is delivered to the fluid end 42 through the suction manifolds 46 and 48 and suction conduits 50.

Continuing with FIG. 3, a discharge manifold 52 is attached to an upper end of the fluid end 42 using a plurality of rigid discharge conduits 54. In operation, the discharge piping system 33 shown in FIG. 2 is attached to the discharge manifold 52. Pressurized fluid is discharged from the fluid end 42 through the discharge conduits 54 and the discharge manifold 52.

The suction and discharge conduits 50 and 54 shown in FIG. 3 are metal and are rigidly connected to the fluid end 42. Such connections are difficult to align and require significant time to properly maneuver into position so they can be attached to the fluid end 42. Even then, the connections may still be misaligned. Any misalignment of the connection between the fluid end 42 and the conduits 50 or 54 increases stress applied to the fluid end 42 over time, thereby reducing the fluid end's operating life. There is a need for a manifold assembly that may be easily and quickly attached to the fluid end without significant misalignment concerns.

DETAILED DESCRIPTION

Turning now to FIGS. 4-34, FIG. 4 shows one embodiment of a high-pressure pump 60. The pump 60 comprises a fluid end 62 attached to a power end 64 using a plurality of stay rods 66. Various features of the fluid end 62 and the power end 64 not described herein are described in more detail in U.S. patent application Ser. No. 17/884,691, authored by Keith, et al., the entire contents of which are incorporated herein by reference ("the '691 Application"). To the extent the nomenclature within the '691 Application is different from the nomenclature used in the present application when referring to the same or substantially similar components, the present application controls.

Figure 4:
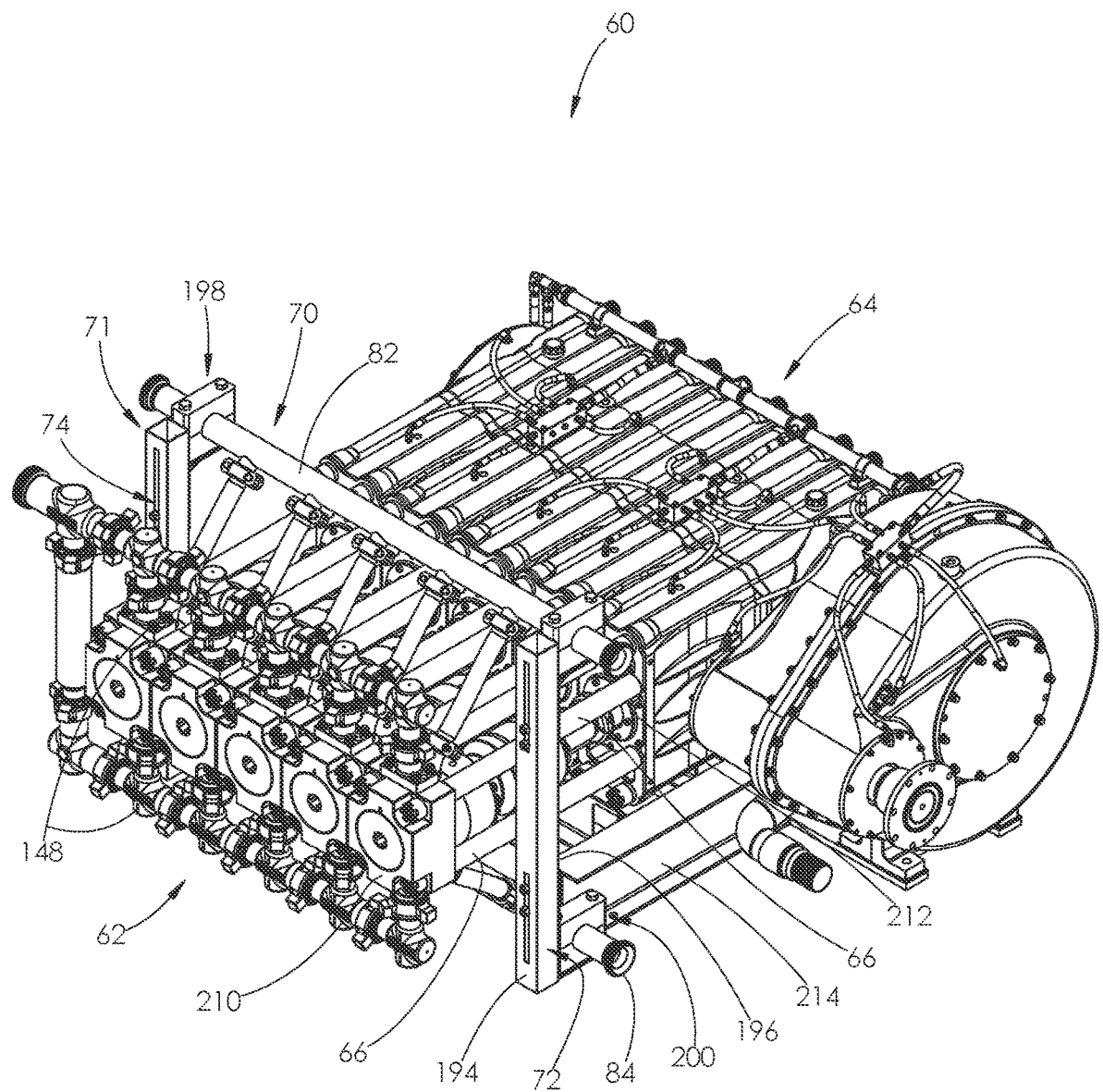
FIG. 4 is a front perspective view of one embodiment of a high-pressure pump having one embodiment of a manifold assembly attached thereto and disclosed herein.
Figure 18:
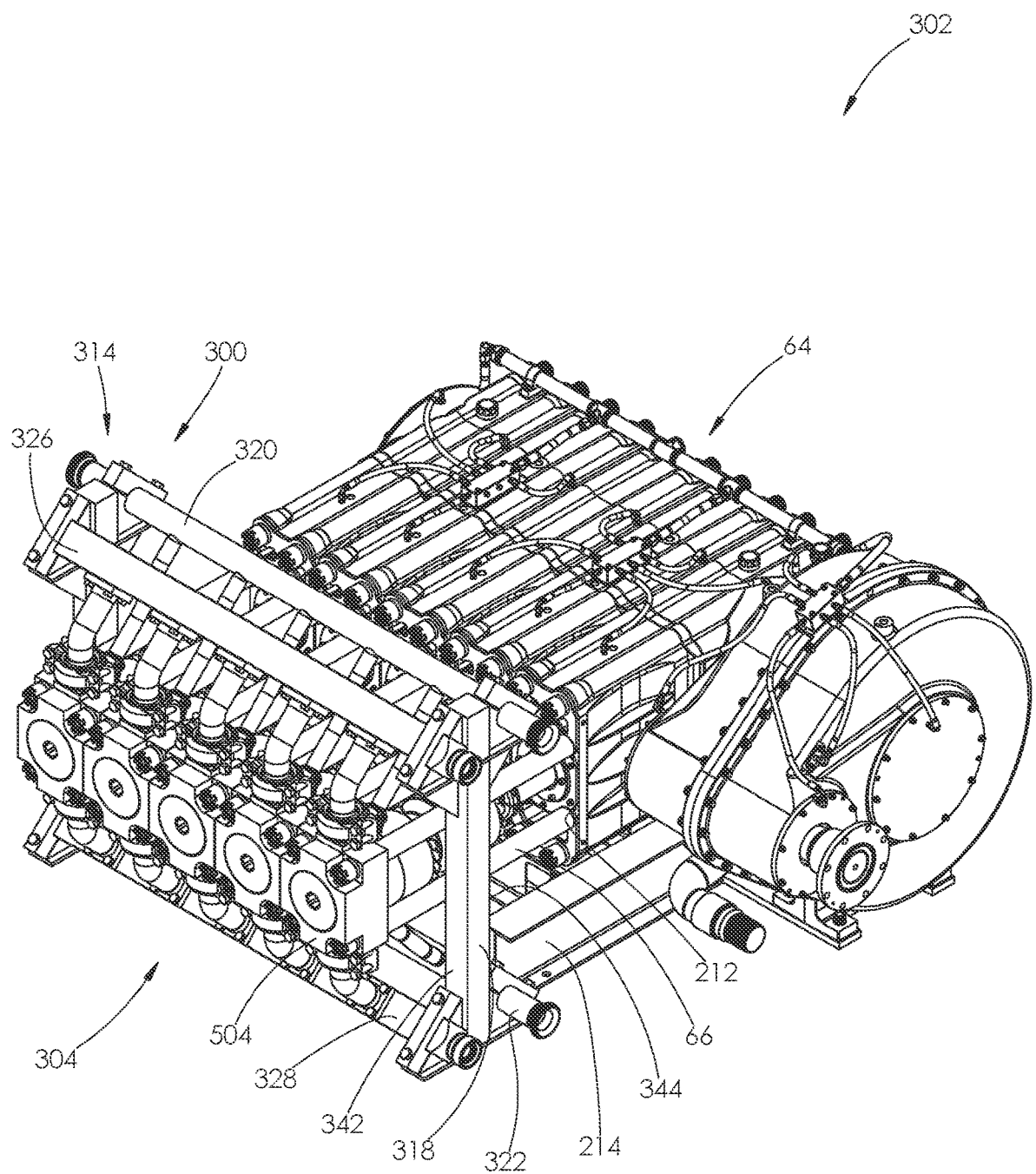
FIG. 18 is a front perspective view of another embodiment of a high-pressure pump having another embodiment of a manifold assembly attached thereto and disclosed herein.

Continuing with FIG. 4, a manifold assembly 70 is shown attached to the fluid end 62. The manifold assembly 70 is configured to be quickly and easily connected to the fluid end 62 while at the same time reducing the risk of failures due to misalignment between the connections. The manifold assembly 70 shown in FIG. 4 is configured for use with only an upper and lower suction manifold 82 and 84. However, it is contemplated that another embodiment of a manifold assembly 300 may be configured for use with both an upper and lower suction manifold 320 and 322 and an upper and lower discharge manifold 326 and 328, as shown in FIG. 18. While not specifically shown herein, it is further contemplated that another embodiment of a manifold assembly may be configured for use with only an upper and lower discharge manifold.

The manifold assemblies 70 and 300 shown in FIGS. 4-34 may each be referred to as a "quick connect manifold assembly". The manifold assembly 70, shown in FIGS. 4-17, will be described in detail first herein, followed by the manifold assembly 300, shown in FIGS. 18-34.

Figure 1:
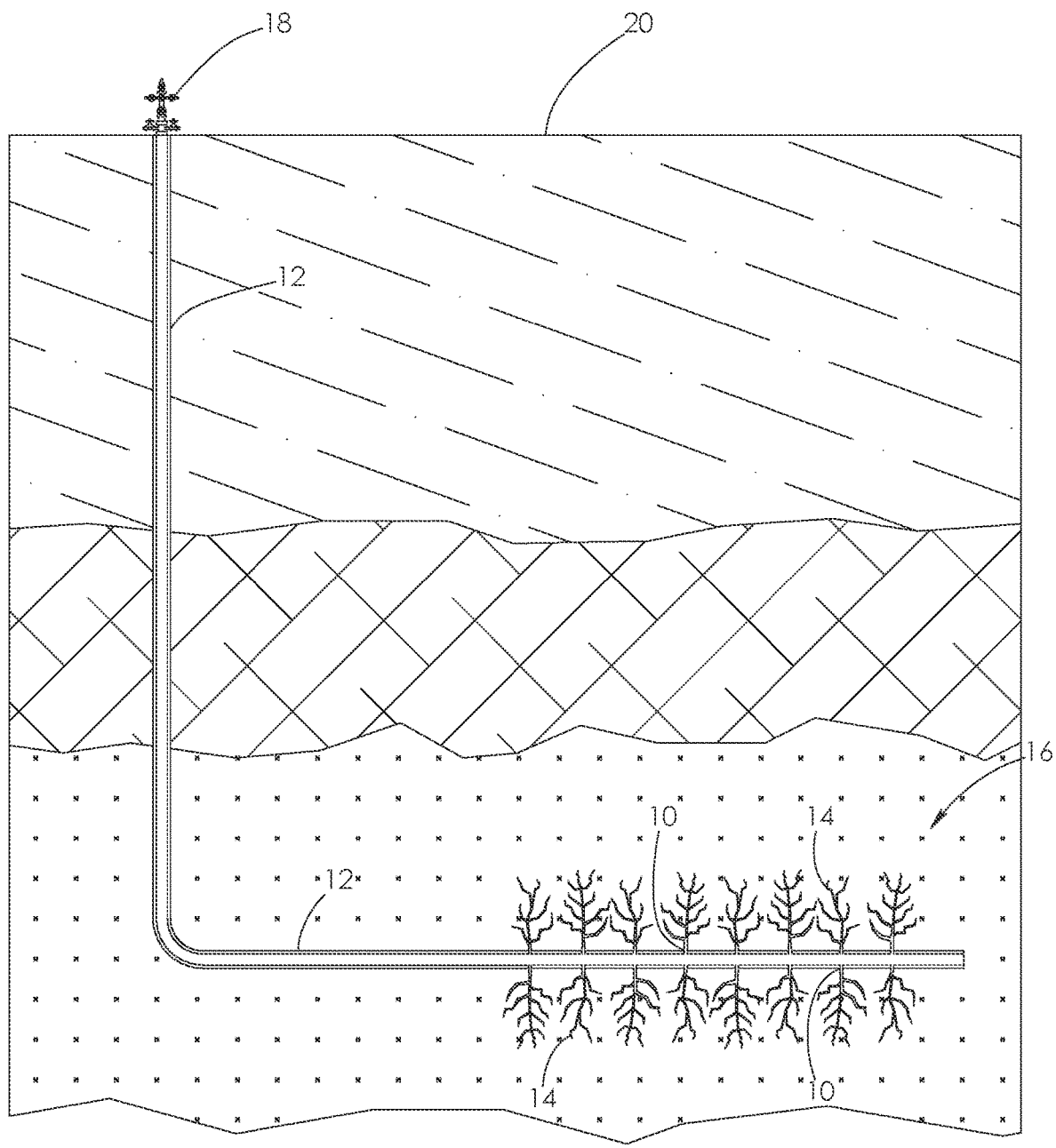
FIG. 1 is an illustration of the underground environment of a hydraulic fracturing operation.
Figure 2:
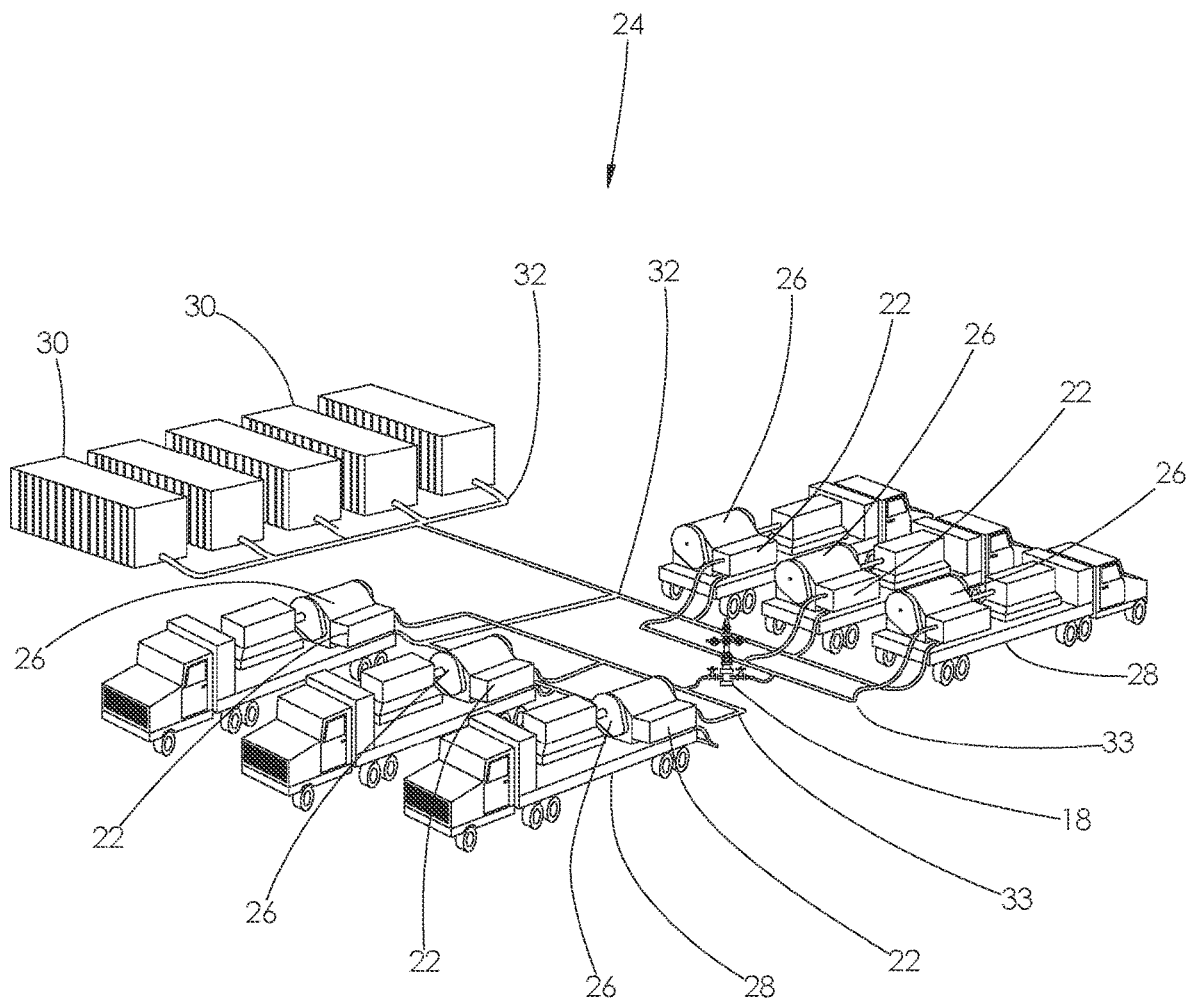
FIG. 2 illustrates above-ground equipment used in a hydraulic fracturing operation.
Figure 3:
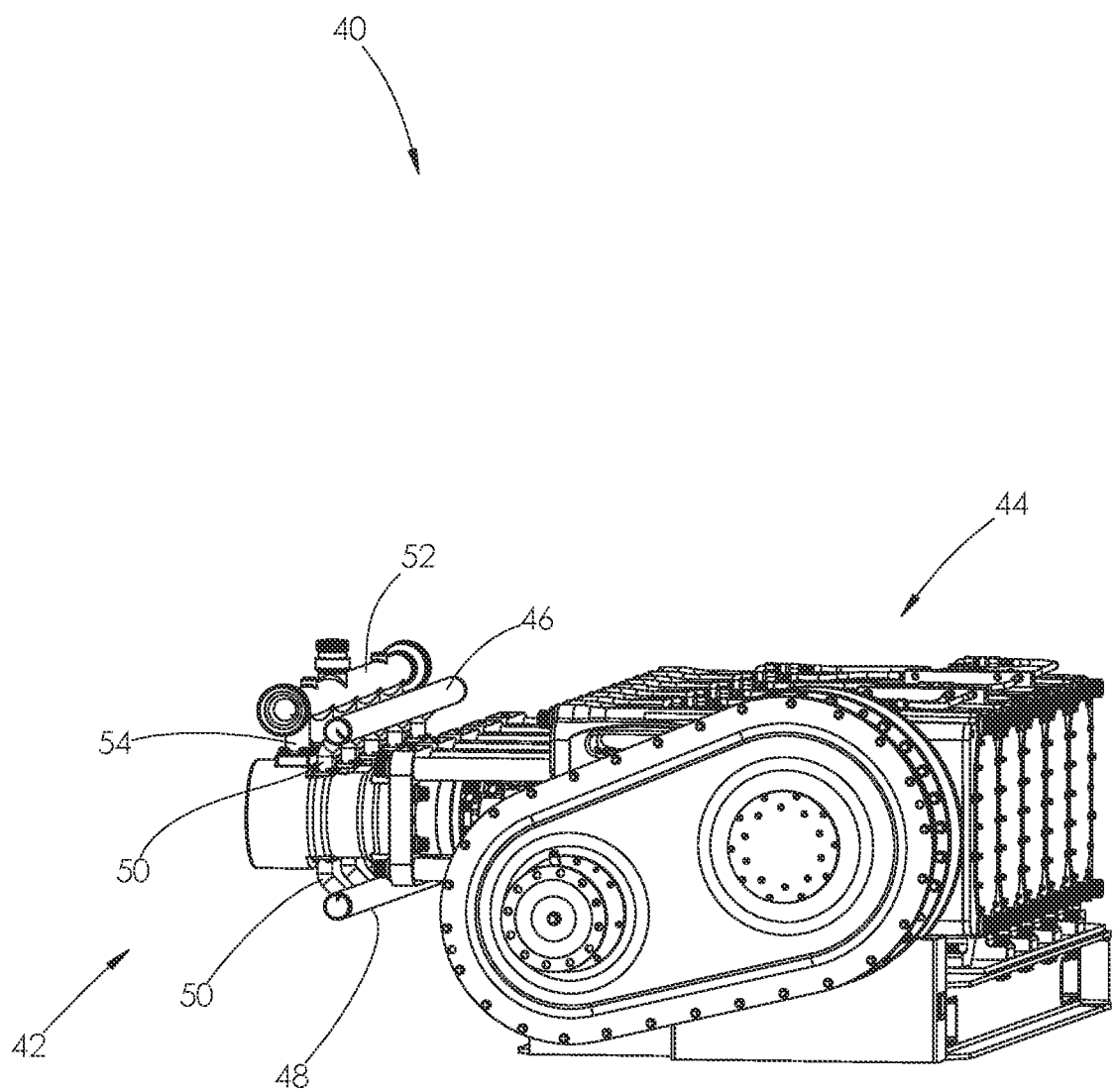
FIG. 3 is a front perspective view of a high-pressure pump known in the art.
Figure 5:
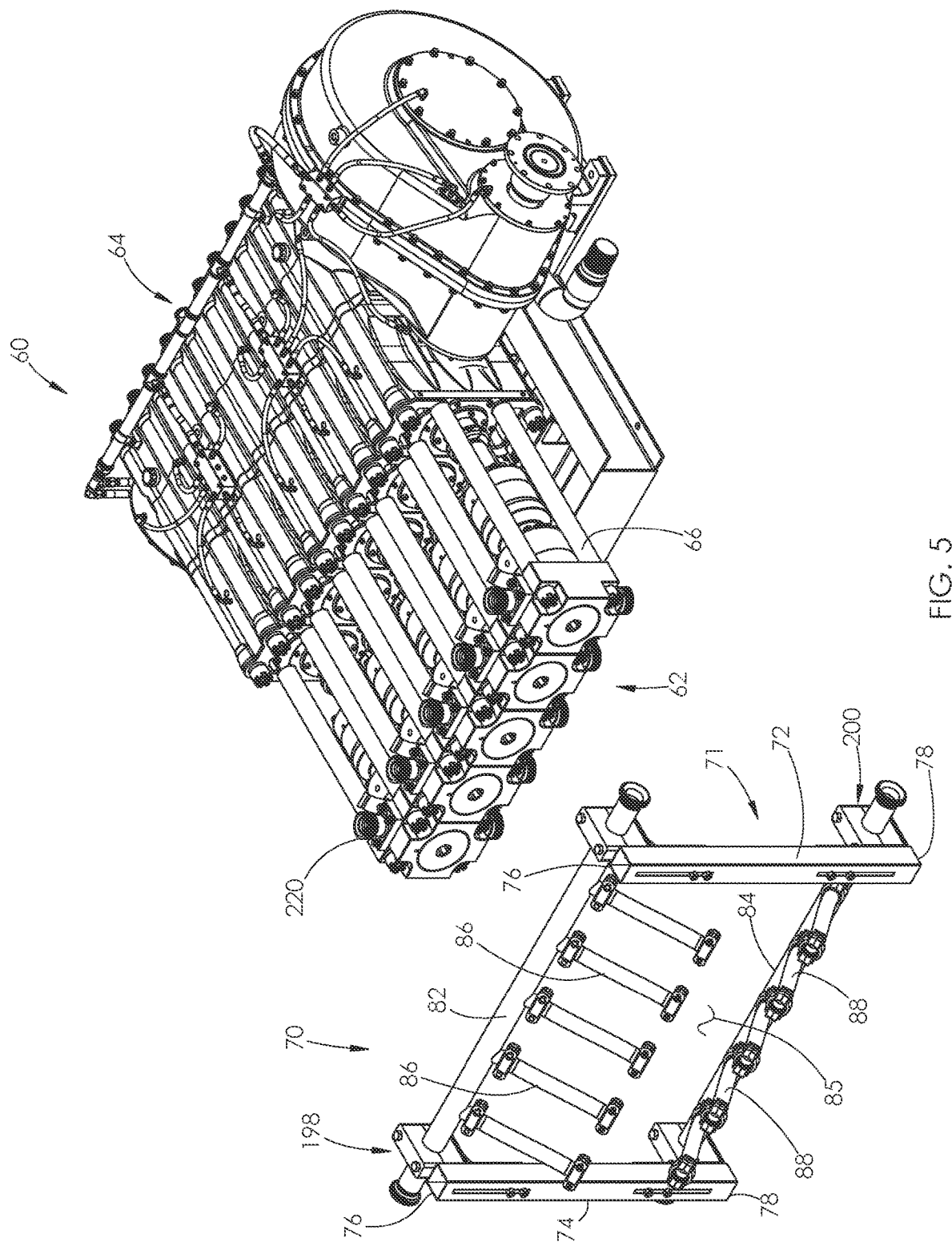
FIG. 5 is an exploded view of the pump and manifold assembly shown in FIG. 4.
Figure 6:
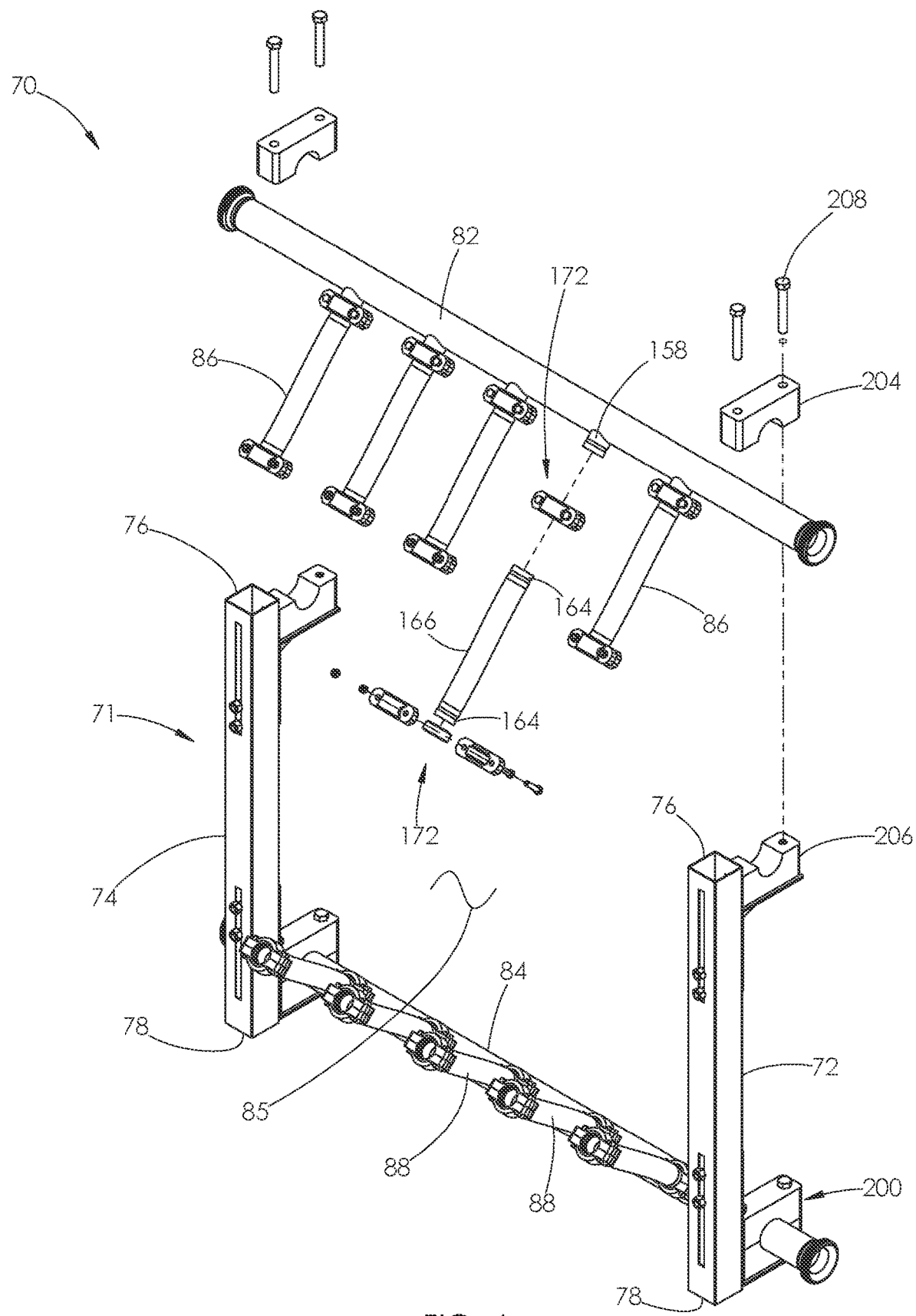
FIG. 6 is a front perspective and partially exploded view of the manifold assembly shown in FIG. 4.

Turning to FIGS. 5 and 6, the manifold assembly 70 comprises a frame 71 comprising a first side post 72 in a spaced relationship with an identical second side post 74. The posts 72 and 74 each have upper and lower ends 76 and 78, with the lower ends 78 being supported on a ground surface 20 or the truck bed 28, shown in FIGS. 1-2. The upper and lower ends 76 and 78 of the posts 72 and 74 may be referred to as the upper and lower ends 76 and 78 of the frame 71. The frame 71 may also be referred to as a "mounting tree".

Continuing with FIGS. 5 and 6, the posts 72 and 74 are joined together by an upper suction manifold 82 and a lower suction manifold 84. As will be described in more detail herein, the upper suction manifold 82 is supported on the upper end 76 of the frame 71, and the lower suction manifold 84 is supported on the lower end 78 of the frame 71. Together, the posts 72 and 74 and manifolds 82 and 84 define a central opening 85.

Continuing with FIGS. 5 and 6, the manifold assembly 70 further comprises a plurality of upper suction conduits 86 and a plurality of lower suction conduits 88. The upper suction conduits 86 are attached to the upper suction manifold 82 at spaced-apart intervals and extend towards the central opening 85. Likewise, the lower suction conduits 88 are attached to the lower suction manifold 84 at spaced-apart intervals and extend towards the central opening 85. As will be discussed in more detail herein, the suction conduits 86 and 88 are flexible, in contrast to rigid metal conduits known in the art. The flexibility of the conduits 86 and 88 allows for easier alignment and attachment to the fluid end 62 during assembly.

Figure 7:
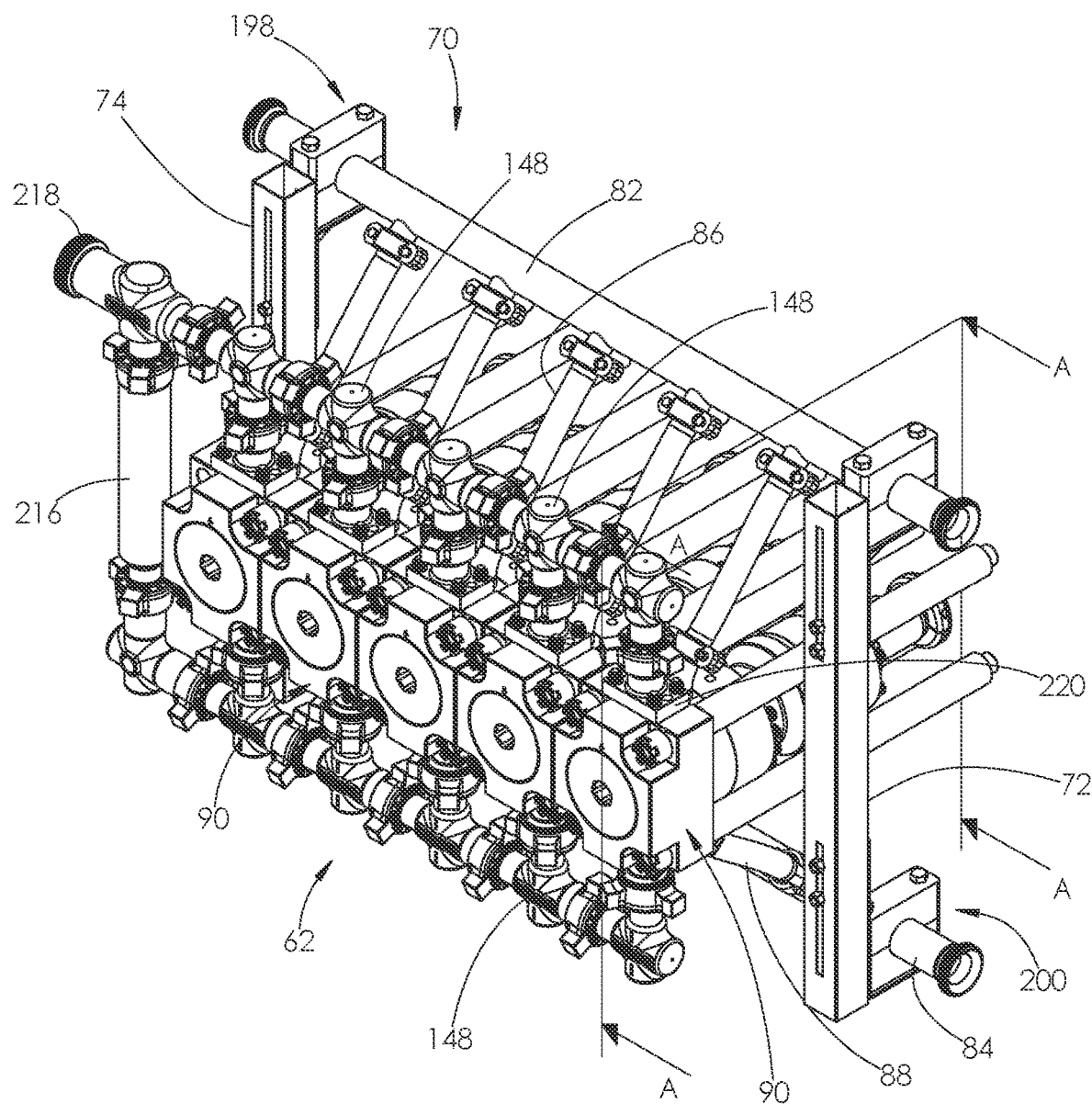
FIG. 7 is a front perspective view of the manifold assembly and fluid end shown in FIG. 4.

Continuing with FIG. 5, when assembled, the manifold assembly 70 may be moved together as a single unit. The single unit assembly 70 may be slid around the fluid end 62 such that at least a portion of the fluid end 62 is positioned within the central opening 85, as shown in FIGS. 4 and 7. When in such position, the side posts 72 and 74 may be adjusted or maneuvered as needed until the upper and lower suction conduits 86 and 88 are properly aligned or closely aligned with the fluid end 62.

The manifold assembly 70 remains a separate unit from the pump 60 until the upper and lower suction conduits 86 and 88 are attached to the fluid end 62. No part of the manifold assembly 70 is ever attached to the fluid end 62 or the power end 64, except for the suction conduits 86 and 88.

The assembly 70 maintains the proper relative positions of its various components while attaching the components to the fluid end 62. Once the manifold assembly 70 is attached to the fluid end 62, the frame 71 may be secured to the ground surface or truck bed 28.

Figure 8:
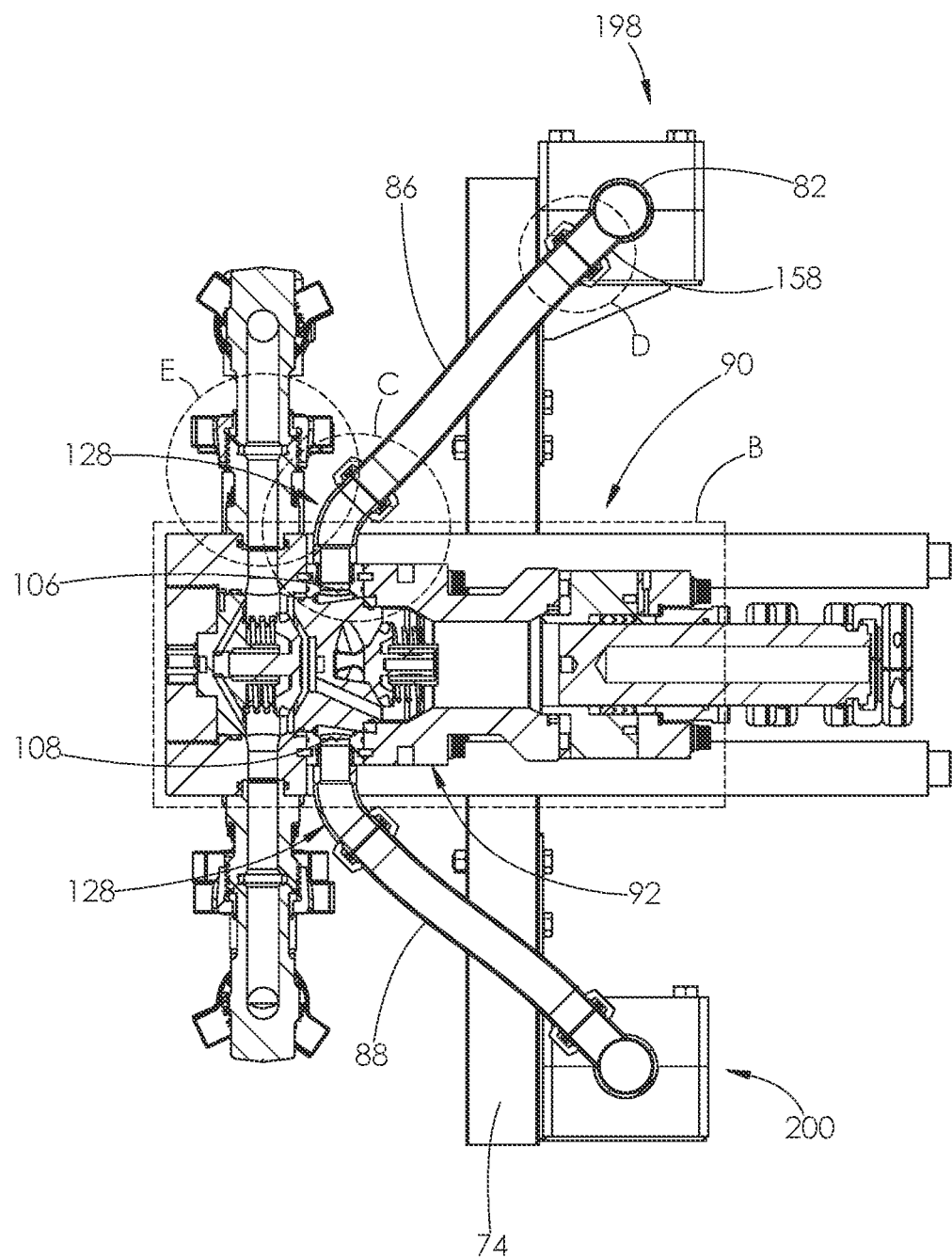
FIG. 8 is a cross-sectional view of the manifold assembly and fluid end shown in FIG. 7, taken along line A-A.
Figure 9:
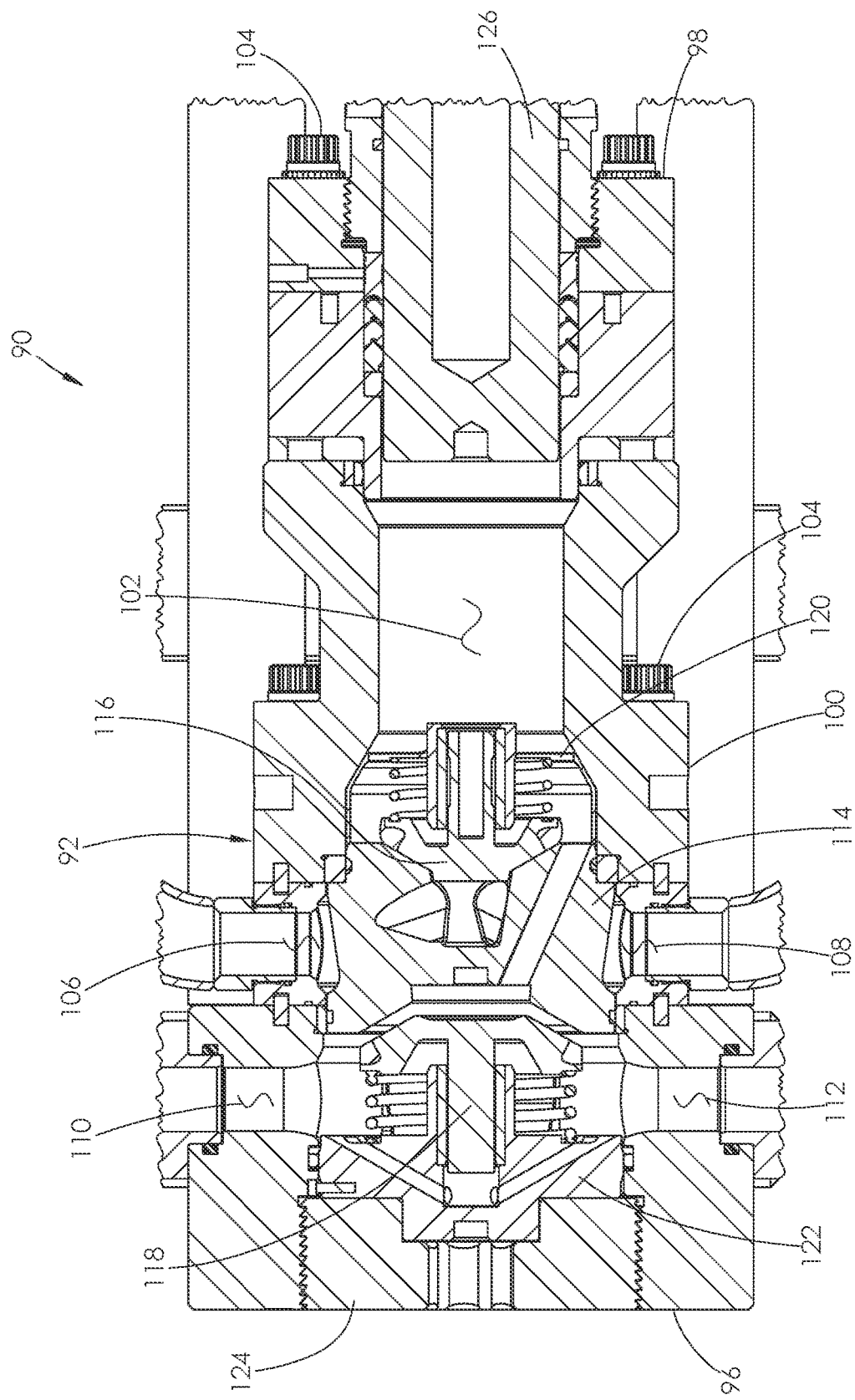
FIG. 9 is an enlarged view of area E, shown in FIG. 8.

Turning to FIGS. 7-9, the fluid end 62 comprises a plurality of fluid end sections 90 positioned in a side-by-side relationship. Each fluid end section 90 comprises a housing 92 having a longitudinal axis extending therethrough. The housing 92 has opposed front and rear surfaces 96 and 98 joined by an outer intermediate surface 100 and a horizontal bore 102 formed therein. The horizontal bore 102 interconnects the front and rear surfaces 96 and 98 of the housing 92, as shown in FIG. 9. The housing 92 shown in FIG. 9 comprises multiple sections joined together by fasteners 104. In alternative embodiments, the housing 92 may be of single-piece construction.

Continuing with FIG. 9, fluid enters the housing 92 through upper and lower suction bores 106 and 108. Fluid exits the housing 92 through upper and lower discharge bores 110 and 112. Fluid is routed throughout the housing 92 by a fluid routing plug 114 and suction and discharge valves 116 and 118. Movement of the valves 116 and 118 is guided by a suction valve guide 120 and a discharge plug 122. The front surface 96 of the housing 92 is sealed by a front retainer 124.

A reciprocating plunger 126 is installed within the horizontal bore 102 and projects from the rear surface 98 of the housing 92. As the plunger 126 retracts from the housing 92, fluid is pulled from the suction bores 106 and 108 into the horizontal bore 102. As the plunger 126 extends into the housing 92, the plunger 126 forces fluid towards the discharge bores 110 and 112. The construction of the housing 92 and its above-mentioned inner components are described in more detail in the '691 Application, previously incorporated herein by reference.

Turning back to FIG. 8, each upper suction conduit 86 corresponds with an upper suction bore 106 formed in each fluid end section 90 in a one-to-one relationship. Likewise, each lower suction conduit 88 corresponds with a lower suction bore 108 formed in each fluid end section 90 in a one-to-one relationship. Each suction conduit 86 and 88 and corresponding suction bore 106 and 108 are interconnected using a suction bore adapter 128.

Figure 10:
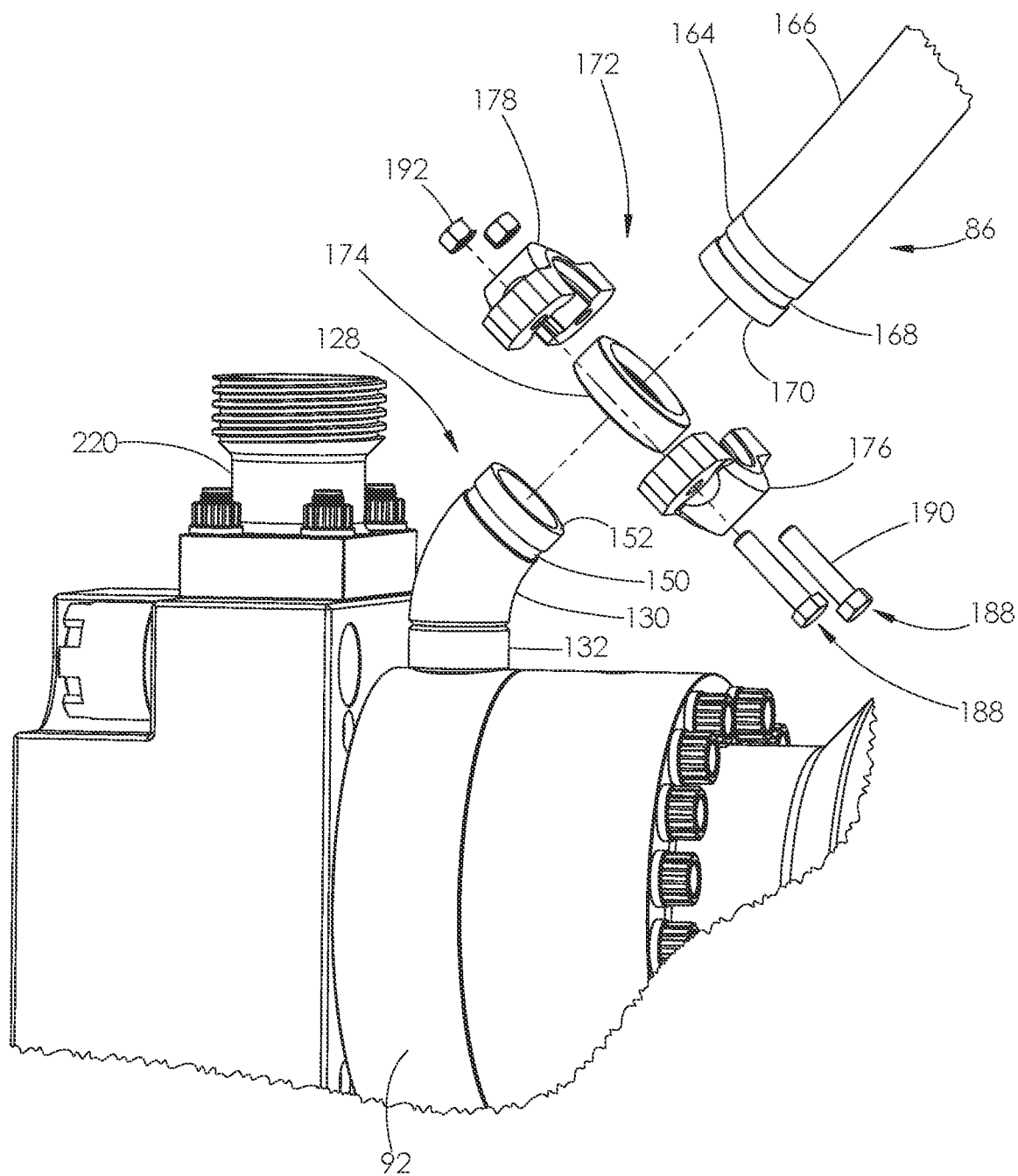
FIG. 10 is a rear perspective and partially exploded view of a portion of one of the fluid end sections and corresponding suction conduit shown in FIG. 7.
Figure 11:
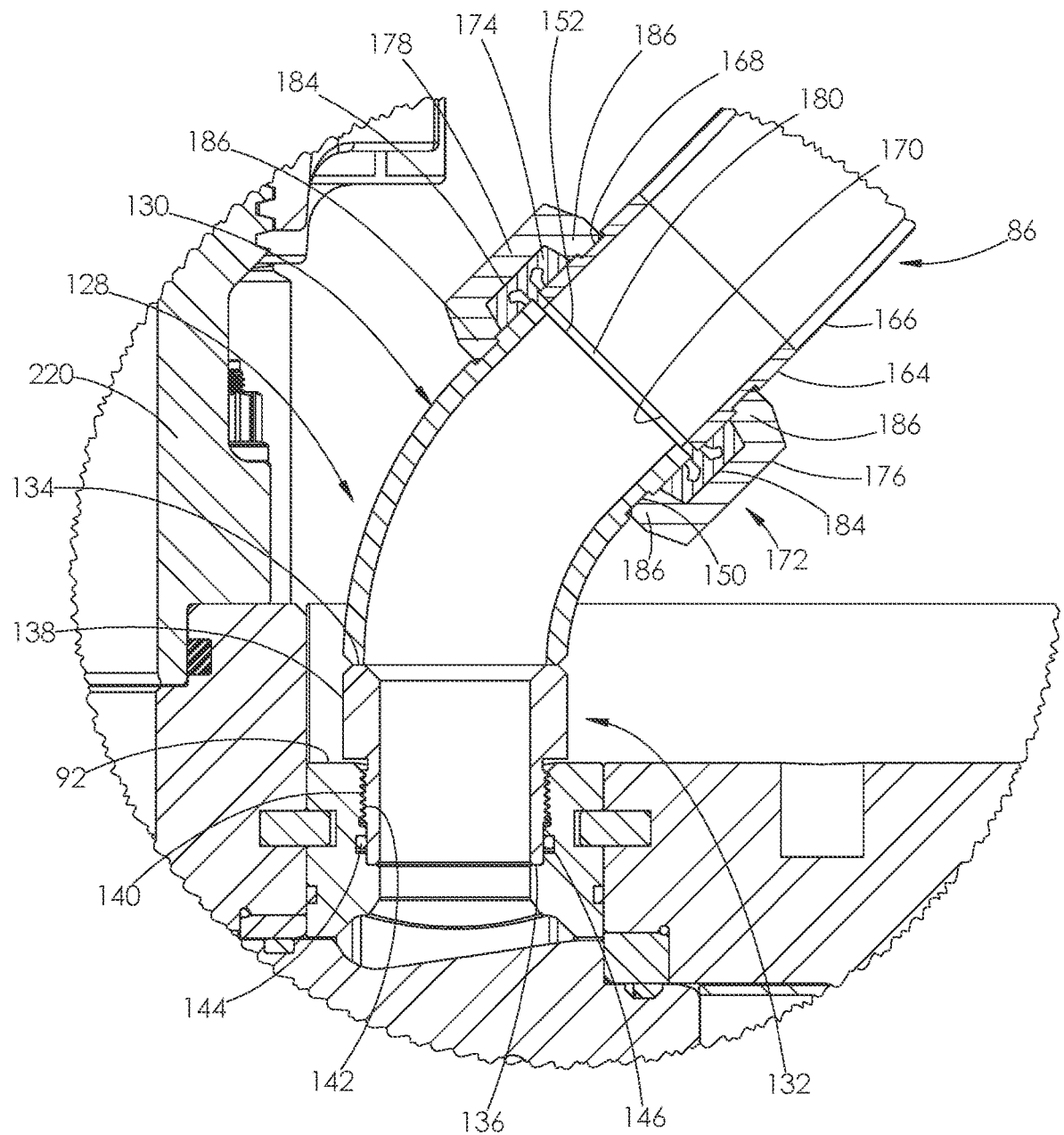
FIG. 11 is an enlarged view of area B, shown in FIG. 8.

Turning to FIGS. 10 and 11, the suction bore adapter 128 comprises an upper end 130 joined to a lower end 132. The ends 130 and 132 are each made of metal or steel and are welded together or may be joined together by other means known in the art. Alternatively, the ends 130 and 132 may be formed as a single, integral piece. The lower end 132 is configured to attach to the housing 92. As shown in FIG. 11, the lower end 132 comprises opposed upper and lower surfaces 134 and 136 joined by an outer intermediate surface 138. External threads 140 are formed in a portion of the intermediate surface 138 for mating with internal threads 142 formed in the walls of the housing 92 surrounding the suction bore 106 or 108.

Continuing with FIG. 11, fluid is prevented from leaking between the suction bore 106 or 108 and the adapter 128 by a seal 144 engaging the intermediate surface 138 of the lower end 132. The seal 144 is positioned between the external threads 140 and the lower surface 136 and is installed within a groove 146 formed in the walls of the housing 92. The intermediate surface 138 between the upper surface 134 and the external threads 140 has a greater outer diameter than the portion carrying the external threads 140 and is positioned outside of the housing 92.

Continuing with FIGS. 10 and 11, the upper end 130 of the suction bore adapter 128 is tubular and is shaped to curve away from a discharge bore adapter 220 attached to each fluid end section 90. Forming the upper end 130 with a curve creates space between the suction bore adapter 128 and the discharge bore adapter 220 once the suction bore adapter 128 is attached to the housing 92. The created space makes forming the connection between the suction bore adapters 128 and the suction conduit 86 and 88 easier. An annular groove 150 is formed on an outer surface of the upper end 130 and spaced from an end surface 152 of the upper end 130. The end surface 152 is configured to mate with one of the suction conduits 86 or 88.

Figure 12:
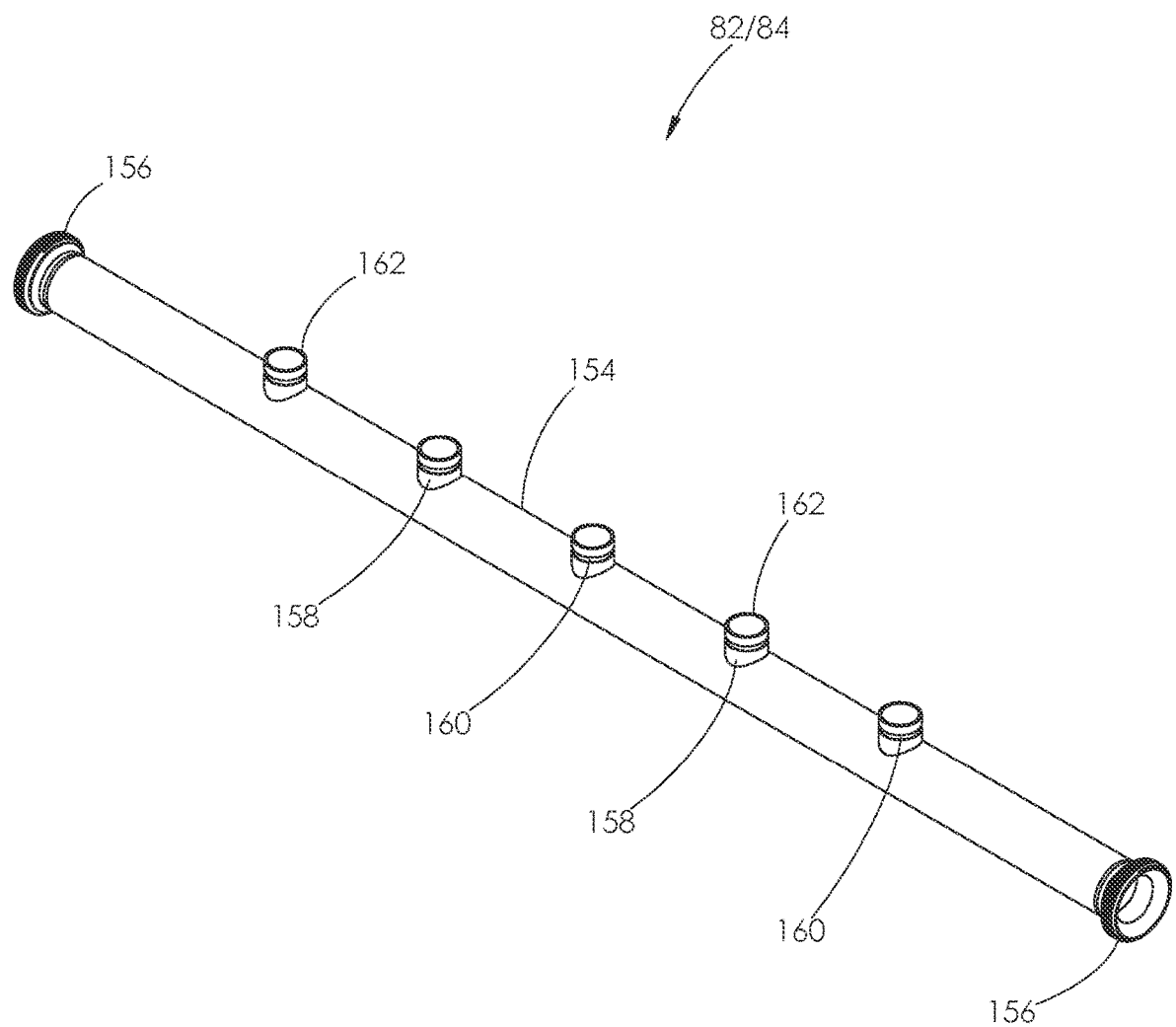
FIG. 12 is a perspective view of one of the suction manifolds shown in FIG. 4.
Figure 13:
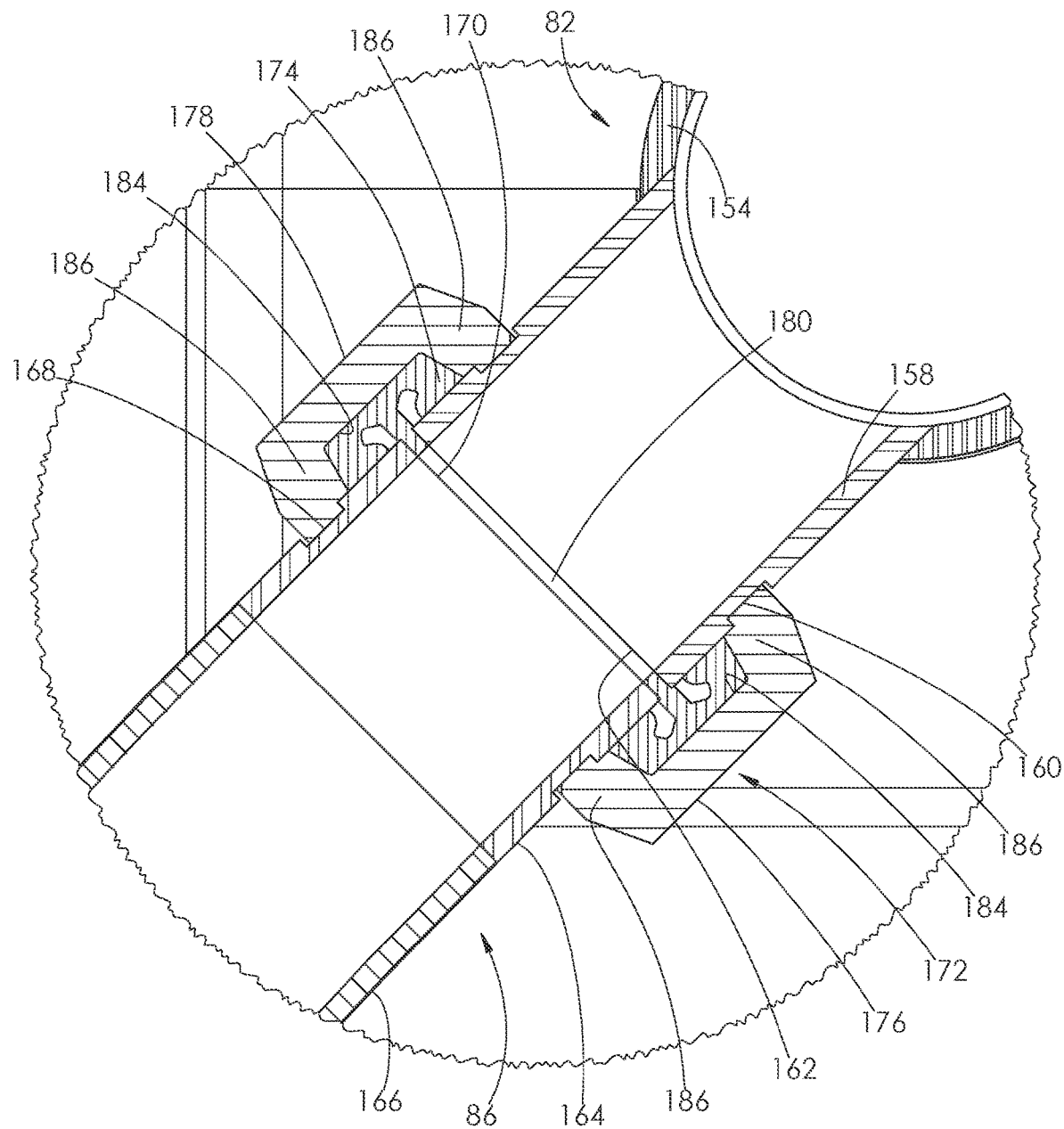
FIG. 13 is an enlarged view of area C, shown in FIG. 8.

Turning to FIGS. 12 and 13, the upper and lower suction manifolds 82 and 84 are identical and each comprise an elongate tubular body or flow tube 154. Each end 156 of the body 154 is configured to mate with the intake piping system 32, shown in FIG. 2. The manifolds 82 and 84 each further comprise a plurality of manifold adapters 158 in fluid communication with the interior of the body 154.

The manifold adapters 158 project from an external surface of the body 154 and are positioned at spaced intervals along the length of the body 154. The position of each manifold adapter 158 aligns with a corresponding one of the bore adapters 128 attached to each fluid end section 90, as shown in FIG. 8. The manifold adapters 158 may be welded to the body 154, integrally formed with the body 154, or attached to the body 154 by other means known in the art. An annular groove 160 is formed in an outer surface of each adapter 158 and is spaced from an end surface 162 of each adapter 158. The end surface 162 is configured to mate with one of the suction conduits 86 or 88, as shown in FIG. 13.

Turning back to FIG. 6, each suction conduit 86 and 88 comprises opposed connection ends 164 joined by a tubular body 166. The tubular body 166 may be made of a flexible material, while the connection ends 164 may each be made of metal. For example, the tubular bodies 166 may be referred to as "hoses" and may be made of nitrile and reinforced with fiber braids covered by a synthetic rubber. Because fluid from the intake piping system 32 has a lower fluid pressure than fluid within the discharge pipe system 33, the tubular body 166 only needs to be durable enough to carry low-pressure fluid. Thus, the tubular bodies 166 may be referred to as "low pressure hoses".

While not shown, the tubular body 166 may be attached to each of the connection ends 164 using a barbed connector integral to the connection end, or other means known in the art. Each suction conduit 86 and 88 is configured to interconnect a manifold adapter 158 and a suction bore adapter 128, as shown in FIG. 8. Because the tubular body 166 of each suction conduit 86 and 88 is made of a flexible material, it may bend and stretch as needed to properly interconnect the adapters 158 and 128.

Continuing with FIGS. 10, 11, and 13, an annular groove 168 is formed in the outer surface of each connection end 164. The groove 168 is spaced from an end surface 170 of the connection end 164 and is configured to receive a portion of a clamp 172, as shown in FIGS. 11 and 13. Likewise, the annular grooves 146 and 160 formed in the corresponding adapters 128 and 158 are each configured to receive a portion of a clamp 172, as shown in FIGS. 11 and 13. The suction conduits 86 and 88 are configured to be clamped to each adapter 128 and 158 so that the conduits 86 and 88 may be easily connected or disconnected from the manifolds 82 and 84 and/or fluid end 62, as needed. No threads are formed in the suction conduits 86 and 88 or the adapters 128 and 158 for mating with one another. In contrast, some suction conduits known in the art are threaded onto components interconnecting the fluid end and conduits, which requires time, can be hard to properly align, and are difficult to seal.

Continuing with FIGS. 10, 11, and 13, the clamp 172 shown in the figures is known in the art as a "Victaulic clamp". Each clamp 172 comprises an annular seal 174, a first side clamp 176, and a second side clamp 178, as shown in FIG. 10. The seal 174 comprises an internal annular lip 180 positioned intermediate opposed side surfaces of the seal 174, as shown in FIGS. 11 and 13. During assembly, the seal 174 is slid over the outer surface of an adapter 128 or 158 until the lip 180 engages an end surface 152 or 162 of the adapter 128 or 158. The connection end 164 of the suction conduit 86 or 88 is then inserted into the seal 174 until its end surface 170 engages the lip 180 such that the lip 180 is sandwiched between the end surfaces 152 or 162 and 170 installed within the seal 174. Such assembly may also be performed by first installing the seal 174 on the suction conduit 86 or 88. When the seal 174 is disposed around the connection end 164 and a corresponding adapter 128 or 158, the grooves 168 and 150 or 160 remain exposed.

Continuing with FIGS. 11 and 13, each first and second side clamp 176 and 178 comprises an inner groove 184 sized to receive a portion of the seal 174. The inner groove 184 is further defined by opposed upper and lower ledges 186. Each ledge 186 is sized to fit within a corresponding one of the grooves 168 and 150 or 160. The ledges 186 are spaced a distance apart that matches the desired distance between the corresponding grooves 168 and 150 or 160 when assembled.

During assembly, the first and second side clamps 176 and 178 are brought together around the seal 174 and the ledges 186 are installed within the grooves 168 and 148 or 150. The side clamps 176 and 178 are then secured together using a plurality of fasteners 188, as shown in FIG. 10. The fasteners 188, shown in FIG. 10, each comprise a threaded bolt 190 and nut 192. In alternative embodiments, other types of fastening systems known in the art may be used to secure the side clamps 176 and 178 together, such as studs and nuts or screws.

When the clamp 172 is secured to the conduit 86 or 88 and corresponding adapter 128 or 158, the seal 174 is held tightly against the outer surfaces of the connection end 164 and the adapter 128 or 158, while the lip 180 is compressed between the end surfaces 170 and 152 or 162. The seal 174 prevents any fluid from leaking between the conduit 86 or 88 and the adapter 128 or 158 during operation. The lip 180 also allows for some movement between the end surfaces 170 and 152 or 162 without compromising the seal 174, thereby allowing tolerance for any misalignment between the parts during operation.

Figure 14:
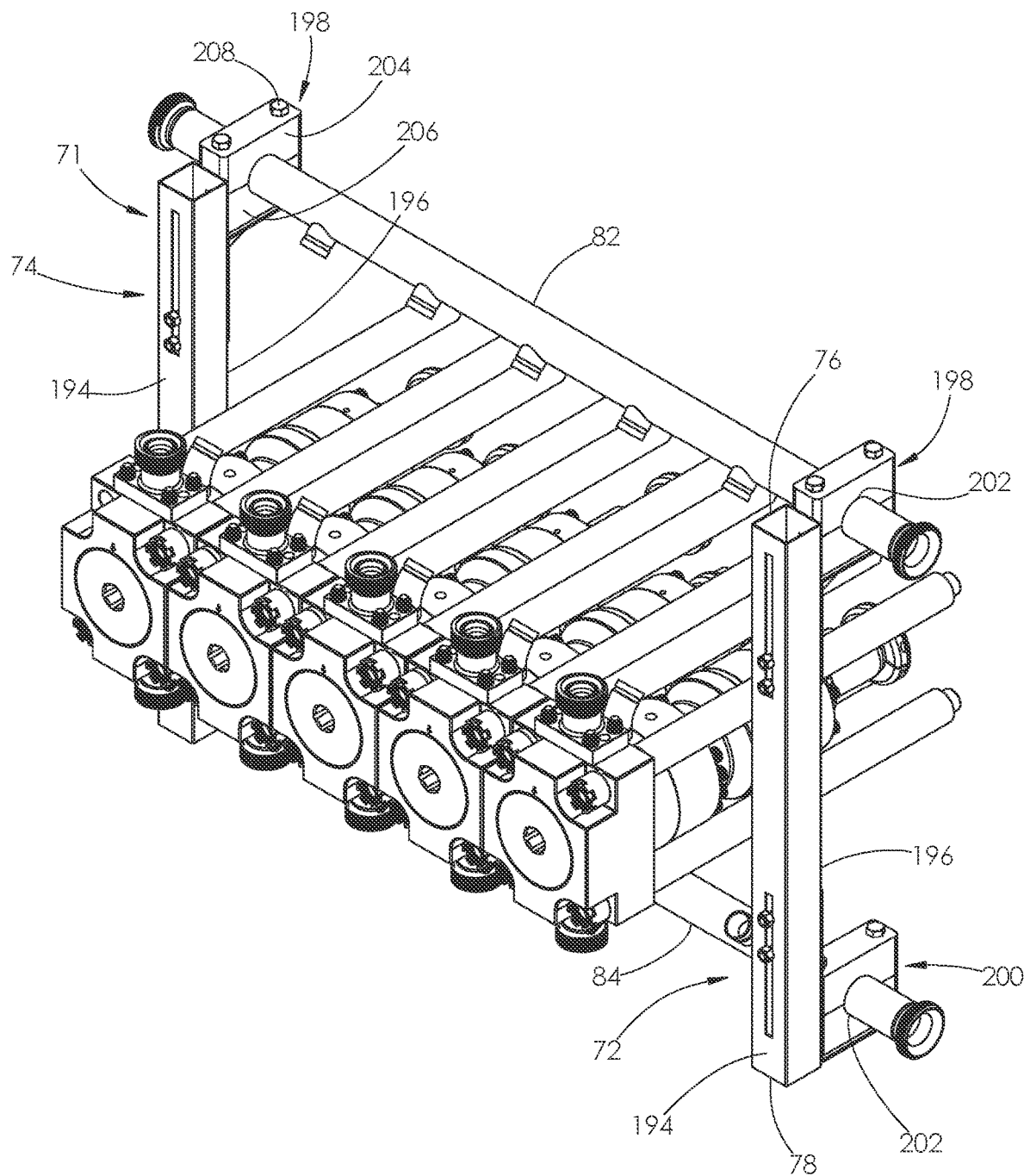
FIG. 14 is the front perspective view of the manifold assembly and fluid end shown in FIG. 7, but the suction and discharge conduits have been removed for clarity.
Figure 15:
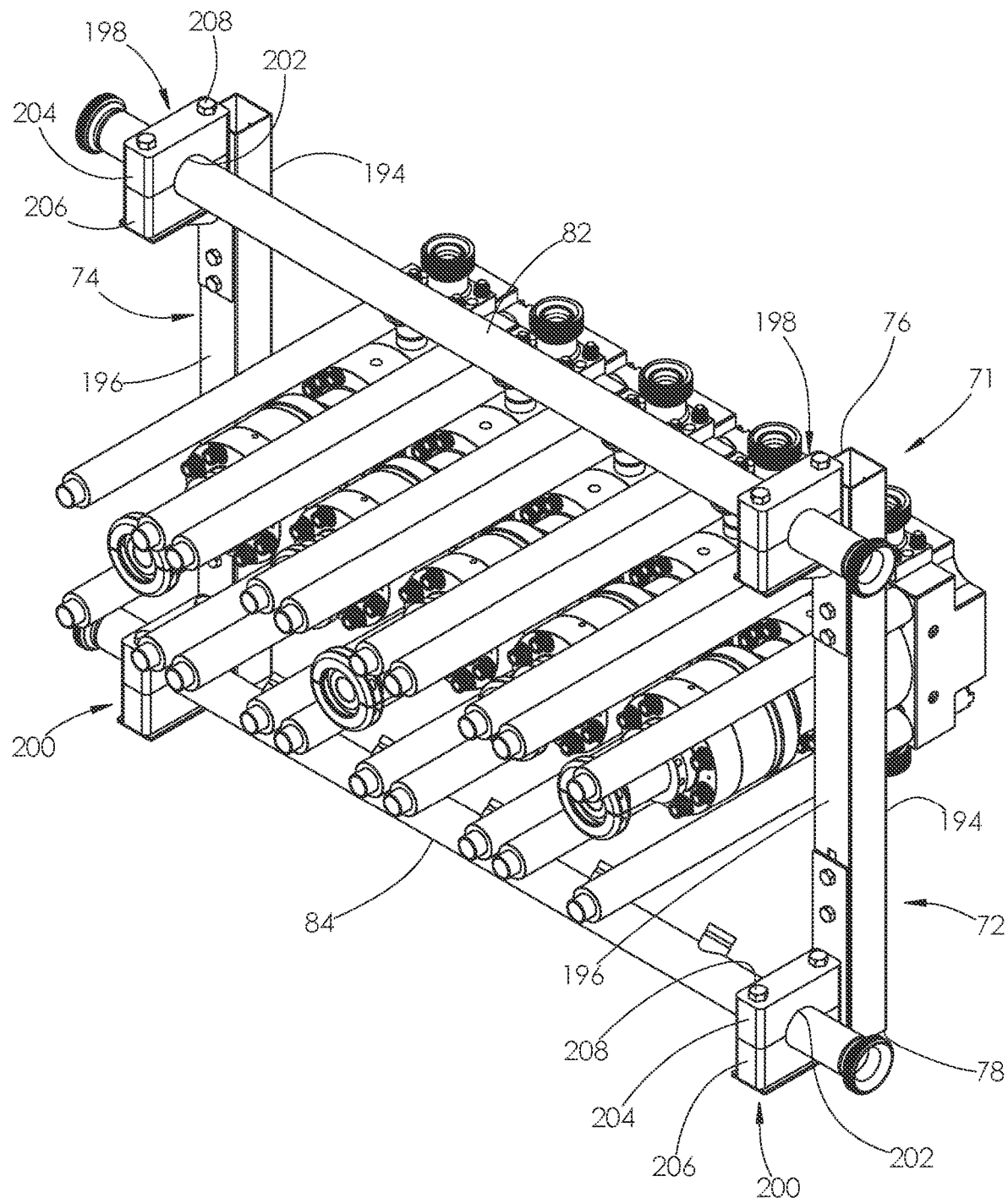
FIG. 15 is a rear perspective view of the manifold assembly and fluid end shown in FIG. 14.

Turning now to FIGS. 14 and 15, each side post 72 and 74 comprises opposed front and rear surfaces 194 and 196. The frame 71 further comprises upper and lower blocks 198 and 200 attached to the rear surface 196 of each post 72 and 74. The lower blocks 200 are attached to the lower end 78 of the frame 71 and are supported on the ground surface 20 or truck bed 28, and the upper blocks 198 are attached to the upper end 76 of the frame 71.

Each block 198 and 200 has a central opening 202 sized to conform to the outer surface of each manifold 82 and 84. As shown in FIGS. 6, 14, and 15, each block 198 and 200 comprises a removable top half 204 that mates with a stationary bottom half 206 to form the central opening 202. The bottom half 206 of each block 198 and 200 may also be referred to as a "cradle". The manifold 82 or 84 may be set in the bottom half 206 and secured within the block 198 or 200 by attaching the top half 204 to the bottom half 206 using a pair of fasteners 208. The fasteners 208 shown in FIGS. 6, 14, and 15 are screws. In alternative embodiments, other types of fasteners known in the art may be used, such as a threaded stud and nut or bolts and screws. The size of the central opening 202 is such that when the fasteners 208 are torqued to specification, each suction manifold 82 and 84 is able to rotate about and slide along its longitudinal axis within the blocks 198 and 200. However, the fasteners 208 are still torqued enough so that the removeable top halves 204 and stationary bottom halves 206 will not vibrate loose during operation.

Turning back to FIGS. 4-7, the upper suction manifold 82 is installed within the upper blocks 198 such that the upper suction conduits 86 extend downwards at about a 45-degree angle relative to the side posts 72 and 74. Likewise, the lower suction manifold 84 is installed within lower blocks 200 such that the lower suction conduits 88 extend upwards at about a 45-degree angle relative to the side posts 72 and 74. Such configuration allows the manifolds 82 and 84 to be spaced a good working distance from the discharge bore adapters 220 and discharge conduits 148, thereby providing more room for assembly or disassembly.

Continuing with FIG. 4, when the manifold assembly 70 is positioned around the fluid end 62, at least a portion of each fluid end section 90 extends past the front and rear surfaces 194 and 196 of each post 72 and 74. Likewise, at least a portion of each stay rod 66 extends past the front and rear surfaces 194 and 196 of the posts 72 and 74. The posts 72 and 74 are positioned intermediate a front surface 210 of the fluid end 62 and a front surface 212 of the power end 64. A portion of the frame 71 may overlap with a portion of a base 214 of the power end 64.

The manifold assembly 70 is configured so that each component can be easily shifted or maneuvered as needed to properly align the various components. The suction conduits 86 and 88 can move relative to the manifolds 82 and 84 and the frame 71. Likewise, the frame 71 and manifolds 82 and 84 can be moved relative to the fluid end 62 and the power end 64. The various components are not rigidly connected to one another.

In operation, the suction conduits 86 and 88, being less rigid than traditional metal pipe conduits, allow for the relative movement between the manifolds 82 and 84 and the pump 60. Likewise, limited movement of the suction manifolds 82 and 84 is permitted within the blocks 198 and 200 during operation. Allowing movement of the components transmits a minimal amount of force and vibration to the fluid end sections 90, thereby increasing the life and maintenance intervals of all of the components of the pump 60. Additionally, the modular nature of the manifold assembly 70 reduces maintenance costs, because each component is individually replaceable.

To remove the manifold assembly 70 from the fluid end 62, the fasteners 188 are removed from each clamp 172 securing a suction conduit 86 or 88 and a suction bore adapter 128 together. The clamps 172 are then removed, releasing the manifold assembly 70 from the fluid end 62. The manifold assembly 70 may then be pulled away from the fluid end 62 and the power end 64 and transported to a desired location. Alternatively, the manifolds 82 or 84 may be released from the blocks 198 or 200 and removed without moving the frame 71. The suction conduits 86 or 88 may be removed from the manifolds 82 or 84 prior to moving the manifolds 82 or 84 or the frame 71. Alternatively, the suction conduits 86 or 88 may not be removed from the manifolds 82 or 84 prior to moving the manifolds 82 or 84 or the frame 71.

Continuing with FIG. 7, a plurality of upper and lower discharge conduits 148 are shown attached to the fluid end 62. The discharge conduits 148 are similar to those known in the art. Each conduit 148 is attached to an adjacent conduit 148 to form a discharge pathway eventually leading to a discharge manifold 216 positioned adjacent the fluid end 62. The discharge manifold 216 is situated in a parallel relationship with the side posts 72 and 74 and is in fluid communication with both the upper and lower discharge conduits 148. The discharge manifold 216 comprises a connection end 218 configured to mate with the discharge piping system 33, shown in FIG. 2.

Figure 16:
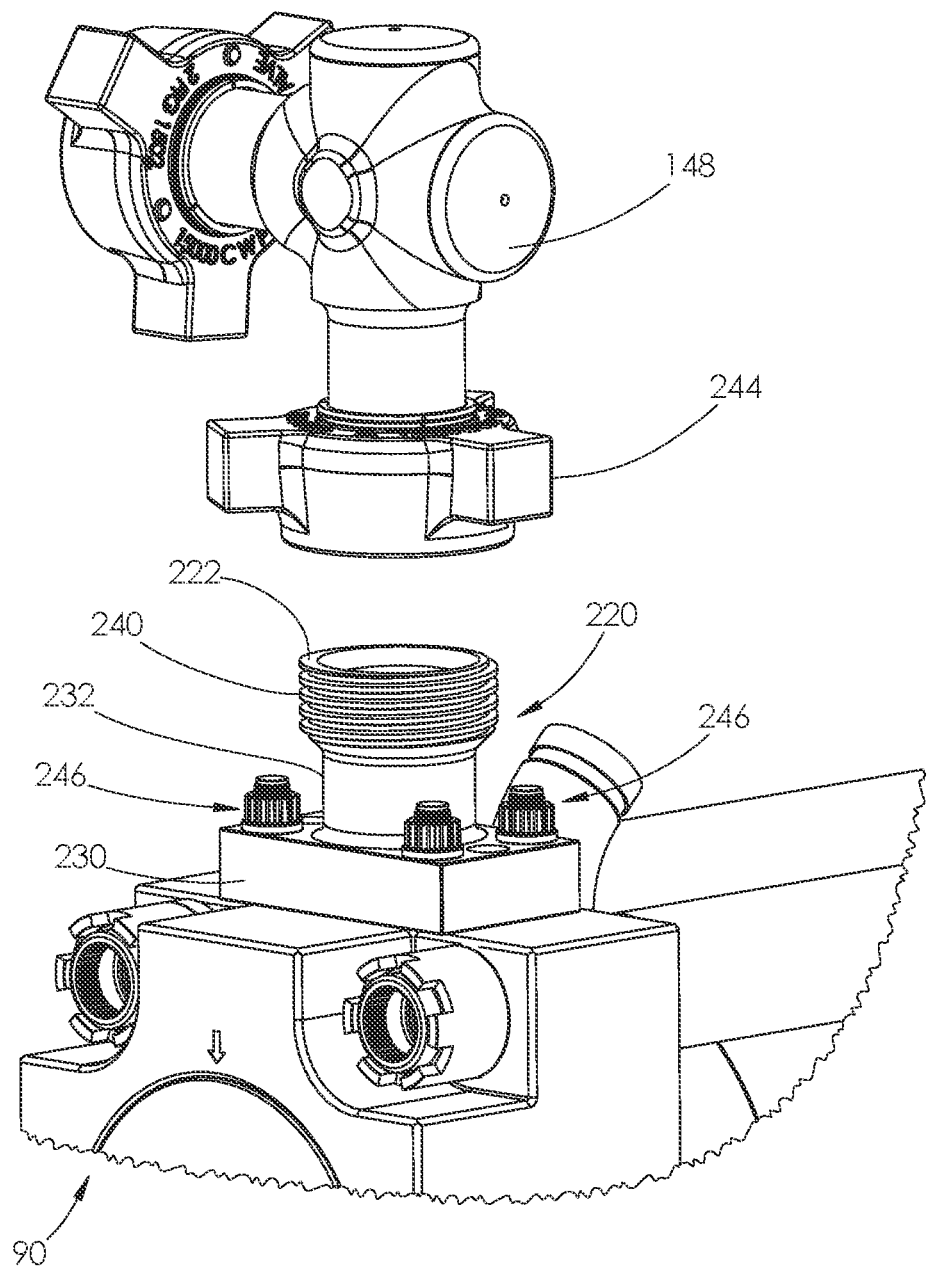
FIG. 16 is a front perspective and partially exploded view of a portion of one of the fluid end sections and corresponding discharge conduit shown in FIG. 7.
Figure 17:
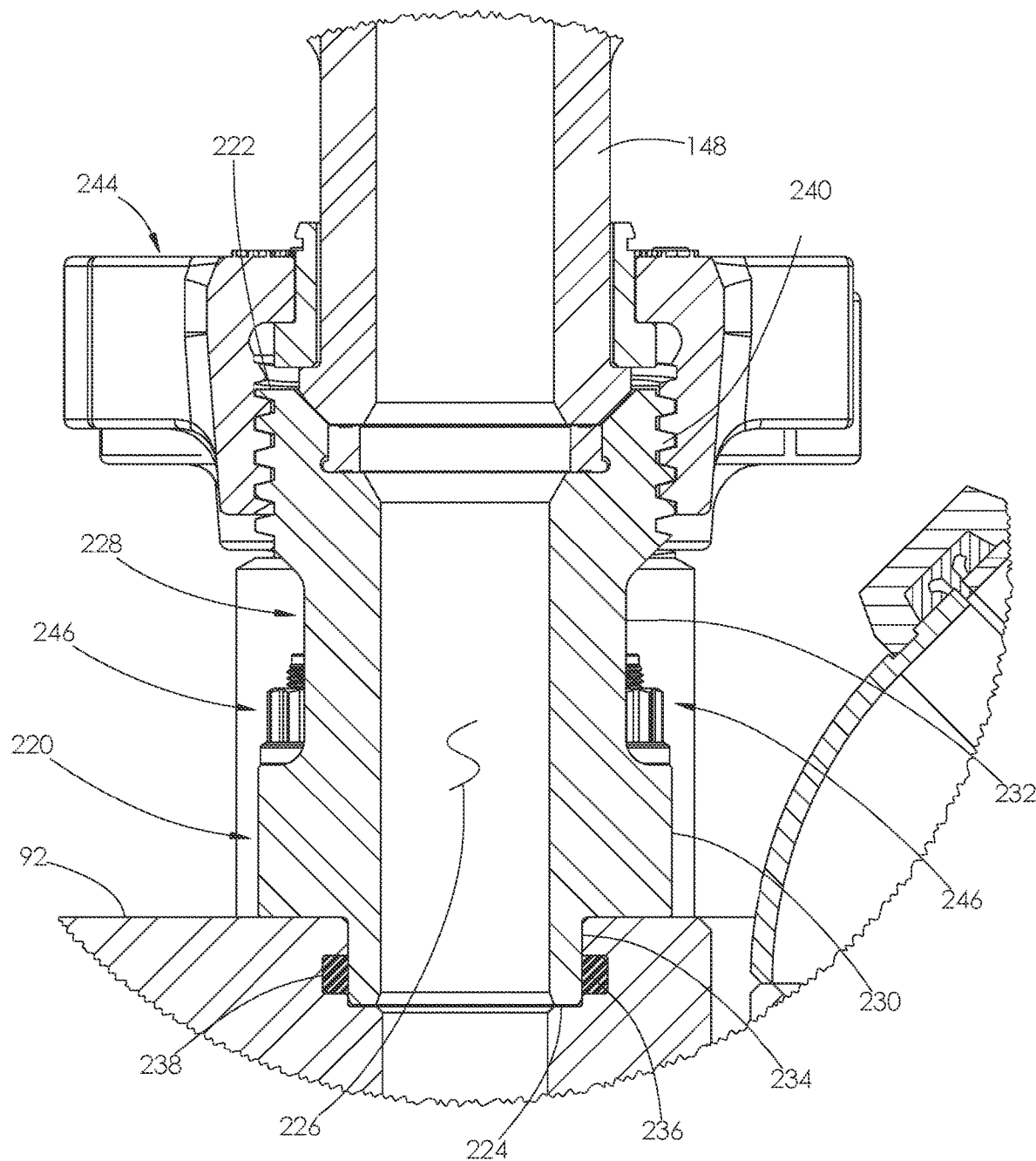
FIG. 17 is an enlarged view of area D, shown in FIG. 8.

Turning now to FIGS. 16 and 17, each discharge conduit 148 is attached to the fluid end section 90 using a discharge bore adapter 220. The discharge bore adapter 220 comprises opposed first and second surfaces 222 and 224 interconnected by an internal passage 226 and an outer intermediate surface 228. The outer intermediate surface 228 comprises a middle portion 230 positioned intermediate upper and lower portions 232 and 234.

The lower portion 234 is installed within the housing 92, as shown in FIG. 17. Fluid is prevented from leaking between the lower portion 234 and the housing 92 by a seal 236 engaging the lower portion 234. The seal 236 is installed within a groove 238 formed in the walls of the housing 92. The upper portion 232 of the adapter 220 is cylindrical and carries external threads 240 adjacent the first surface 222. The upper portion 232 is configured to mate with one of the discharge conduits 148 using a hammer union 244 known in the art.

The middle portion 230 of the discharge bore adapter 220 has a greater outer diameter than the lower portion 234 and is configured to abut the outer surface of the housing 92. The middle portion 230 has the shape of a rectangle and is sized to receive four fasteners 246. The fasteners 246 are installed within the housing 92 and the middle portion 230 and are configured to secure the adapter 220 to the housing 92. The fasteners 246 shown in FIGS. 16 and 17 are each a threaded stud and nut. In alternative embodiments, other types of fasteners such as screws or bolts may be used to secure the adapter 220 to the housing 92.

In alternative embodiments, the manifold assembly 70 shown in FIGS. 4-17 may be configured for use with only an upper suction manifold 82. In such case, the posts 72 and 74 may remain separated at their lower ends 78 or may be joined by any type of elongate member. Likewise, the manifold assembly 70 may be configured for use with only a lower suction manifold 84. In such case, the posts 72 and 74 may remain separated at their upper ends 76 or may be joined by any type of elongate member. In the event the posts 72 and 74 remain separated at either of one of their ends 76 or 78, the posts 72 and 74 and corresponding manifold 82 or 84 may still be considered to define the central opening 85.

In further alternative embodiments, the manifold assembly 70 may be configured for use with a single block fluid end, like that shown in U.S. Pat. No. 10,941,765, issued to Nowell et al., the entire contents are which are incorporated herein by reference ("the '765 Patent"). To the extent the nomenclature within the '765 Patent is different from the nomenclature used in the present application when referring to the same or substantially similar components, the present application controls.

If the manifold assembly 70 is used with the single block fluid end shown in the '765 Patent, bore adapters may be attached to the lower surface of the fluid end block. Such adapters may or may not have a curved shape. The manifold assembly may then only comprise a lower suction manifold and lower suction conduits configured to attach to such bore adapters. The suction conduits may extend between the adapters and the manifold at a non-zero angle relative to the posts or may extend straight down parallel to the posts, depending on the position of the suction manifold relative to the adapters.

Turning now to FIGS. 18-34, the manifold assembly 300 is shown in more detail. The manifold assembly 300 is attached to another embodiment of a high-pressure pump 302. The pump 302 comprises another embodiment of a fluid end 304 attached to the power end 64 using the plurality of stay rods 66.

Figure 24:
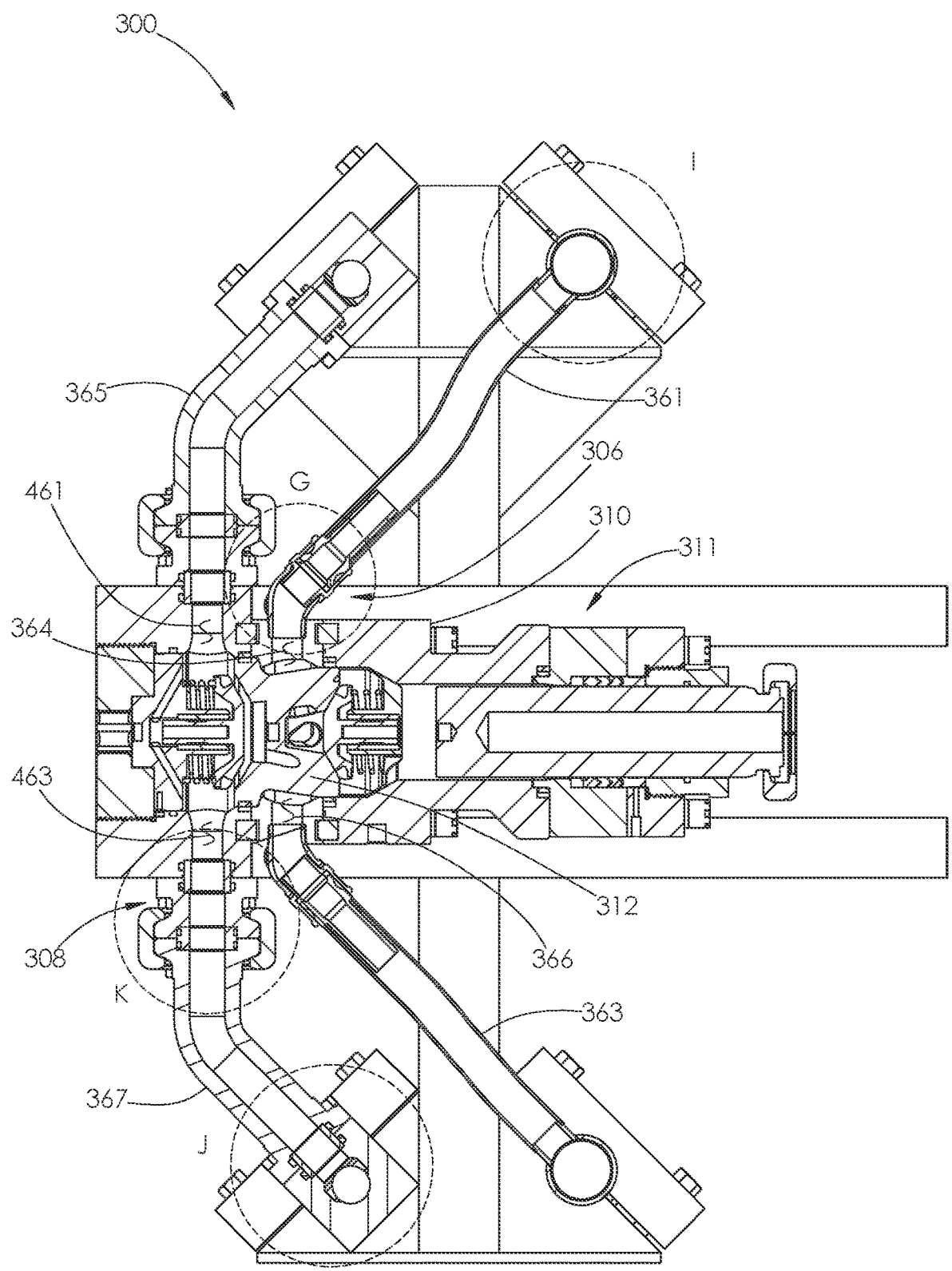
FIG. 24 is a cross-sectional view of the manifold assembly and fluid end shown in FIG. 23, taken along line D-D.

The fluid end 304 is generally similar to the fluid end 62 but comprises slight modifications in order to accommodate different embodiments of suction and discharge bore adapters 306 and 308, as shown in FIG. 24. The inner components of the fluid end 304 are generally similar to the fluid end 62, but a housing 310 making up each fluid end section 311 of the fluid end 304 is configured to receive another embodiment of a fluid routing plug 312. The fluid routing plug 312 and housing 310 are described in more detail in U.S. patent application Ser. No. 17/884,712, authored by Thomas et al., the entire contents of which are incorporated herein by reference ("the '712 Application"). To the extent the nomenclature within the '712 Application is different from the nomenclature used in the present application when referring to the same or substantially similar components, the present application controls.

Figure 19:
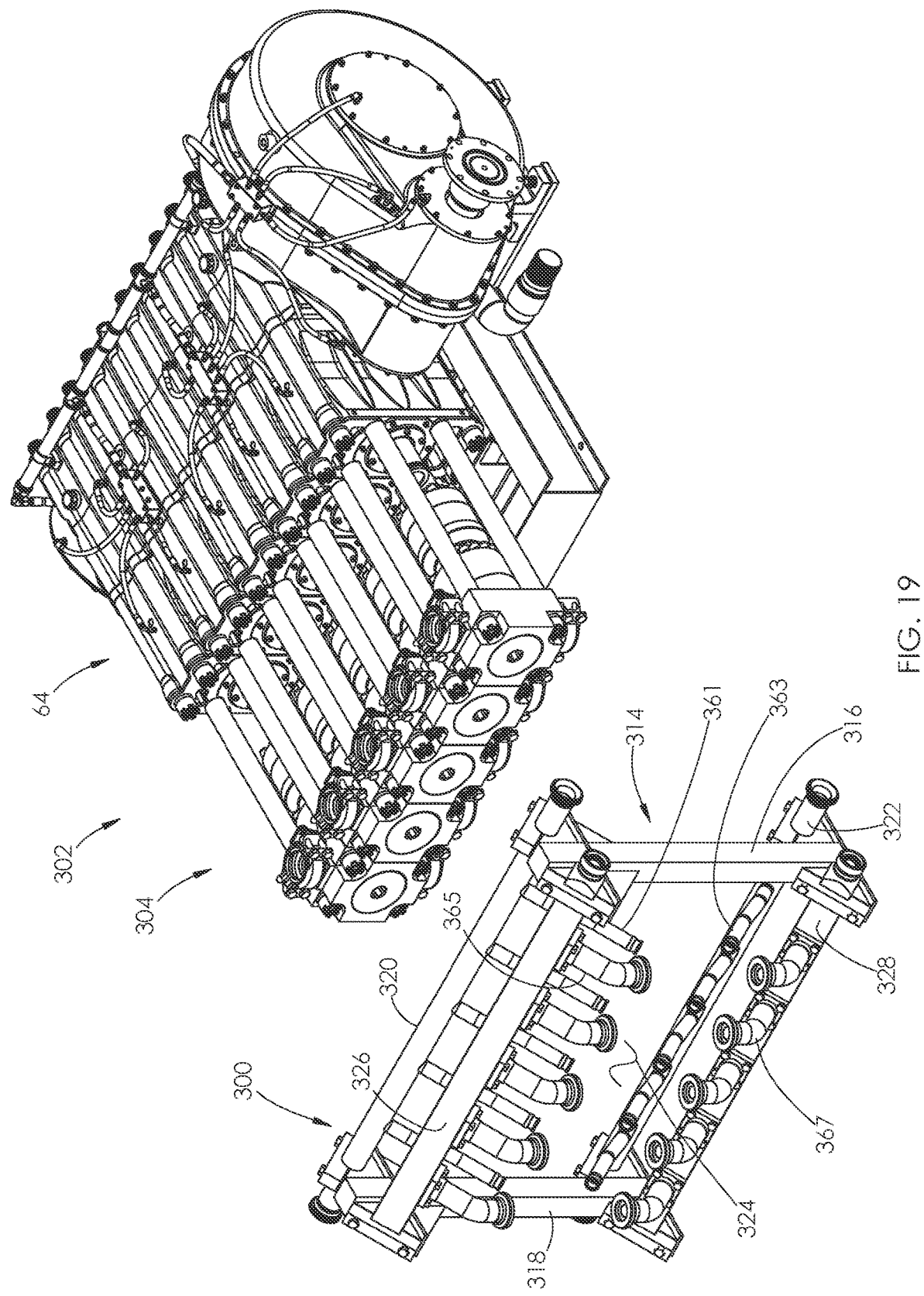
FIG. 19 is an exploded view of the pump and manifold assembly shown in FIG. 18.
Figure 20:
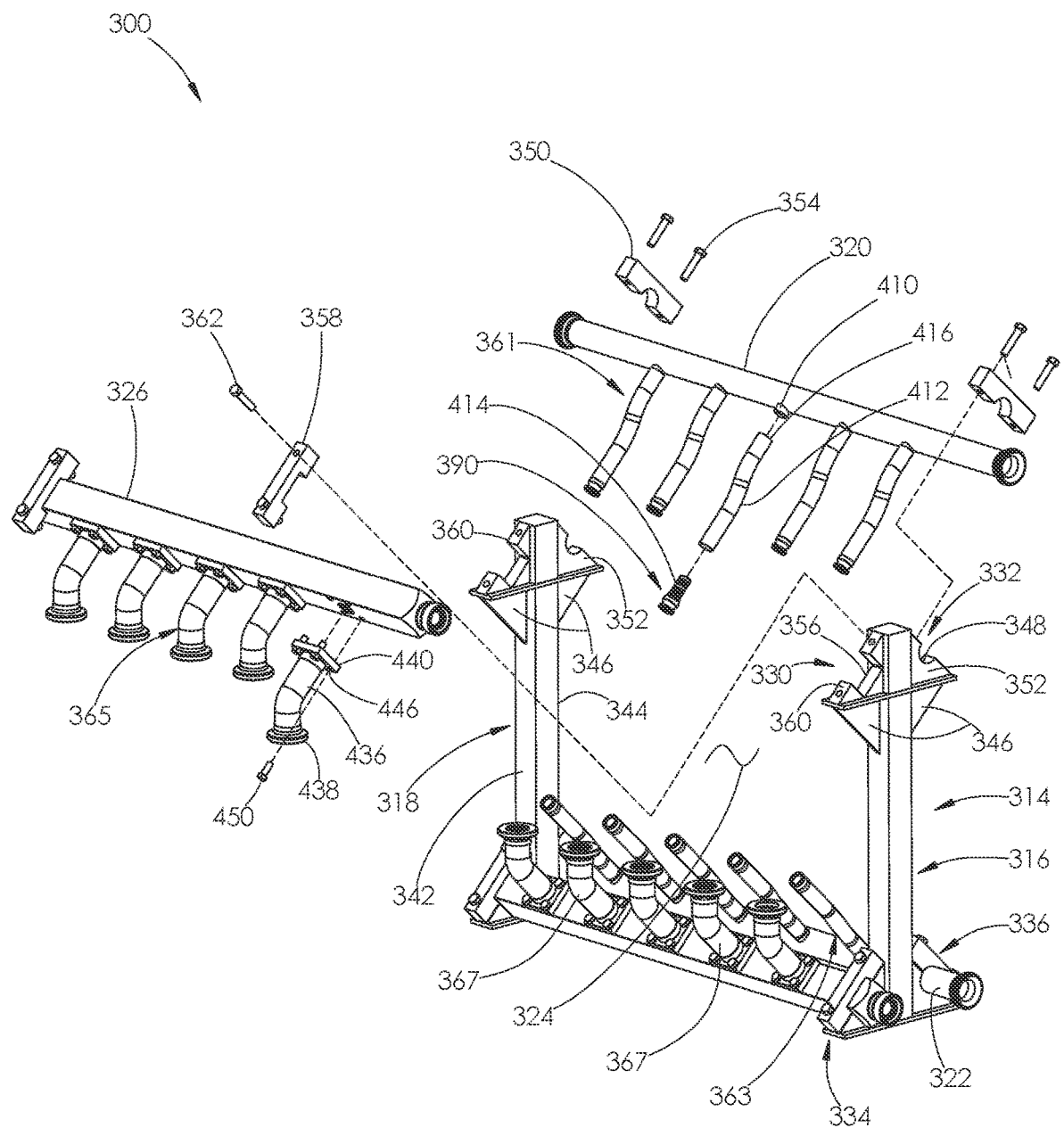
FIG. 20 is a front perspective and partially exploded view of the manifold assembly shown in FIG. 18.

Continuing with FIGS. 19 and 20, the manifold assembly 300 comprises a frame 314 comprising a first side post 316 and an identical second side post 318. The frame 314 may also be referred to as a "mounting tree". Like the manifold assembly 70, the posts 316 and 318 are joined together by an upper suction manifold 320 and a lower suction manifold 322. Together, the posts 316 and 318 and suction manifolds 320 and 322 define a central opening 324. In contrast to the manifold assembly 70, the posts 316 and 318 are further joined by upper and lower discharge manifolds 326 and 328. Together, the posts 316 and 318 and discharge manifolds 326 and 328 further define the central opening 324.

Continuing with FIGS. 19 and 20, a plurality of upper and lower suction conduits 361 and 363 are attached to the corresponding upper and lower suction manifolds 320 and 322. Likewise, a plurality of upper and lower discharge conduits 365 and 367 are attached to the corresponding upper and lower discharge manifolds 326 and 328. With the exception for the connection differences detailed herein, the suction conduits 361 and 363 function in the same manner as the suction conduits 86 and 88. The suction conduits 361 and 363 are flexible and may bend and stretch as needed during assembly and operation. In contrast the manifold assembly 70, the manifold assembly 300 also comprises flexible discharge conduits 365 and 367. Like the suction conduits 361 and 363, the discharge conduits 365 and 367 may bend and stretch as needed during assembly and operation.

Continuing with FIGS. 18 and 19, like the manifold assembly 70, when the manifold assembly 300 is assembled, it may be moved together as a single unit. The single unit assembly 300 may be slid around the fluid end 304 such that at least a portion of the fluid end 304 is positioned within the central opening 324. When in such position, the side posts 316 and 318 may be adjusted as needed until the suction and discharge conduits 361, 363 and 365, 367 are properly aligned with the fluid end 304.

The manifold assembly 300 remains a separate unit from the pump 302 until the suction and discharge conduits 361, 363 and 365, 367 are attached to the fluid end 304. No part of the manifold assembly 300 is ever attached to the fluid end 304 or the power end 64, except for the suctions and discharge conduits 361, 363 and 365, 367. The assembly 300 maintains the position of the components while the conduits 361, 363 and 365, 367 are being attached to the fluid end 304. In some instances, the assembly 300 may stand freely on its own and there is no need to manually support the assembly 300 while the conduits 361, 363 and 365, 367 are being attached to the fluid end 304. Once the manifold assembly 300 is attached to the fluid end 304, the frame 314 may be secured to the truck bed 28 or ground surface 20.

Figure 21:
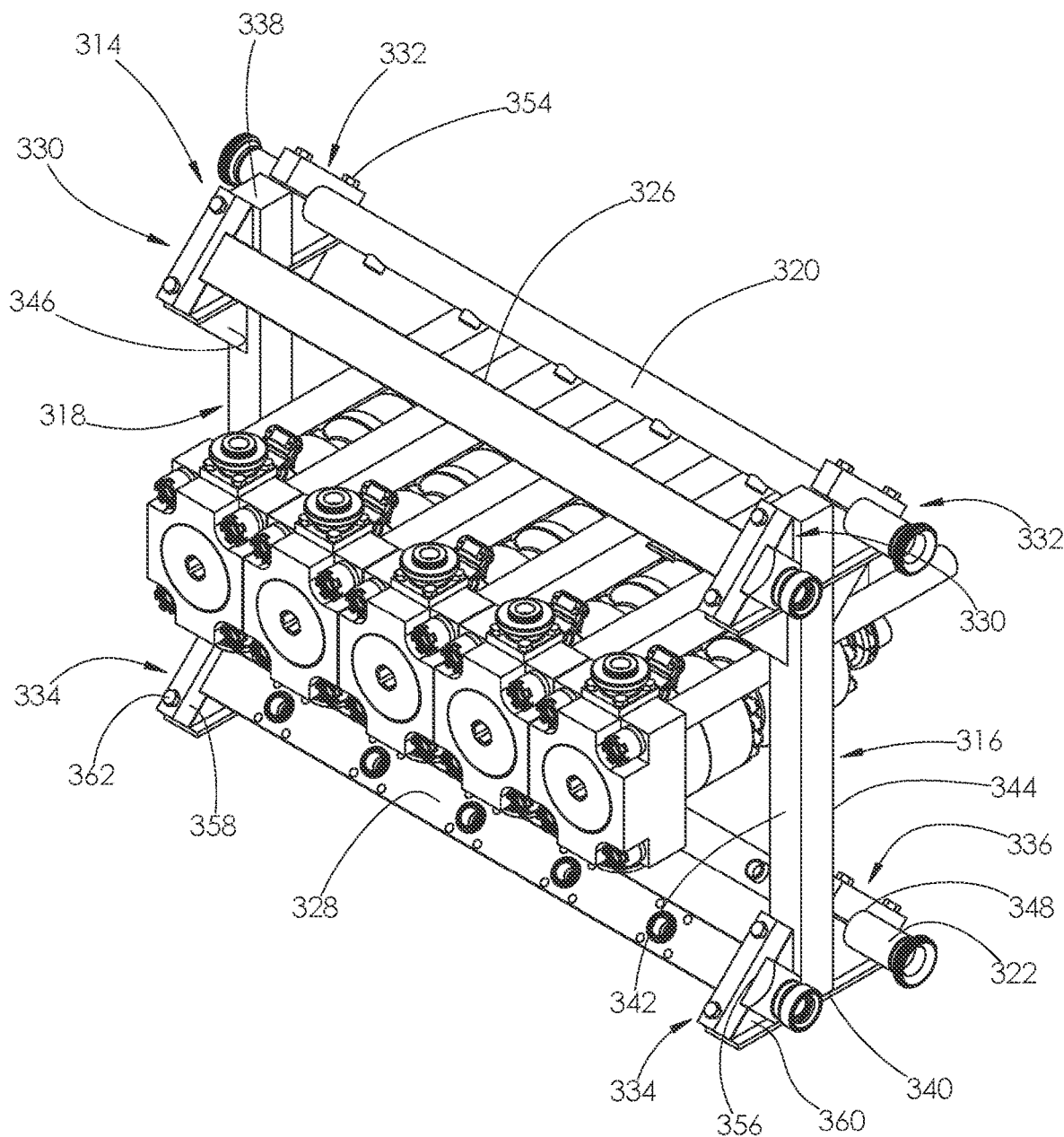
FIG. 21 is a front perspective view of the manifold assembly and fluid end shown in FIG. 18, but the suction and discharge conduits have been removed for clarity.
Figure 22:
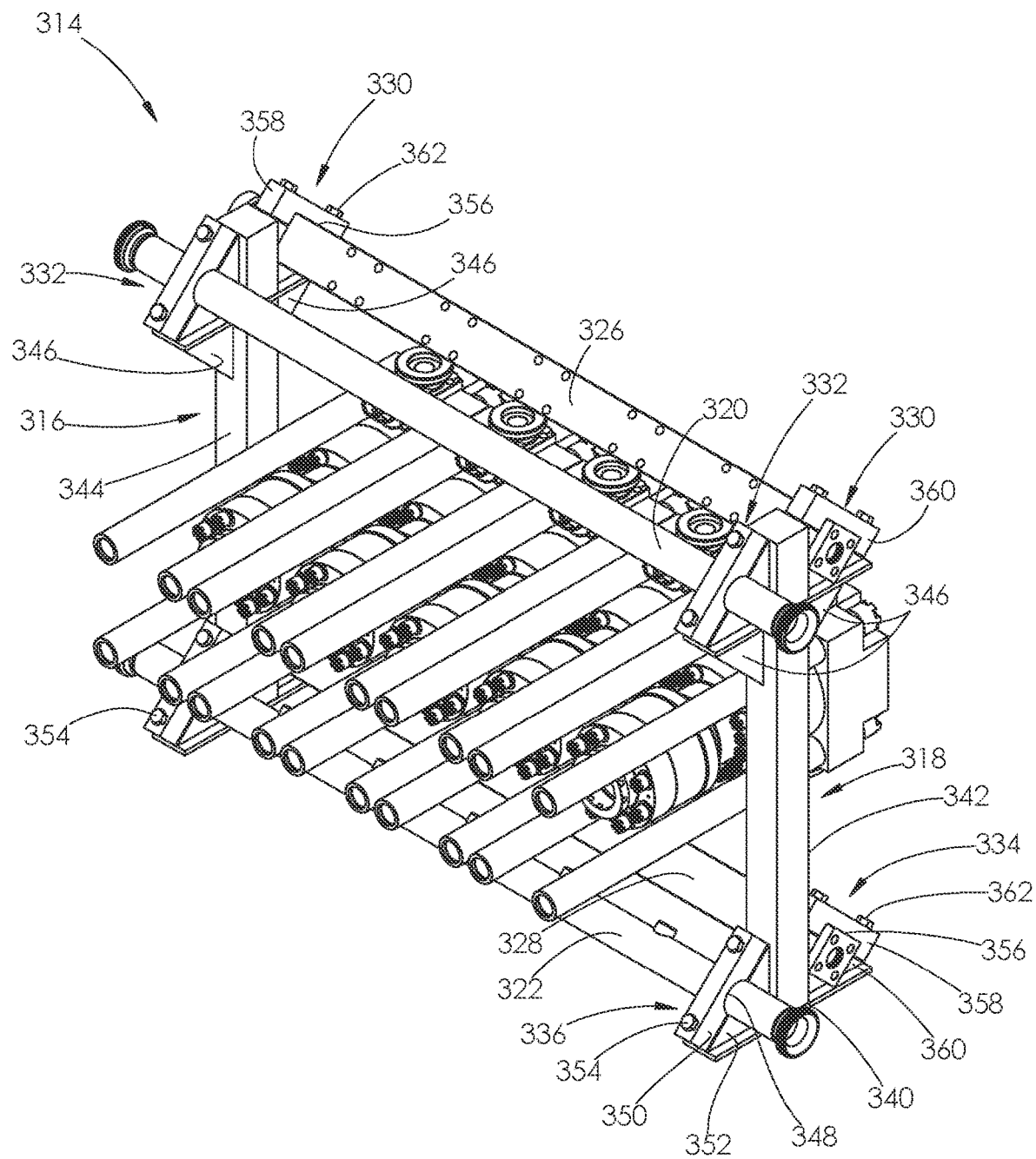
FIG. 22 is a rear perspective view of the manifold assembly and fluid end shown in FIG. 21.

Turning to FIGS. 20-22, the frame 314 further comprises a plurality of upper and lower triangular shaped blocks 330, 332 and 334, 336. Each post 316 and 318 carries two upper blocks 330 and 332 at its upper end 338 and two lower blocks 334 and 336 at its lower end 340. The pairs of blocks 330, 332 and 334, 336 are attached to a front and rear surface 342 and 344 of each post 316 and 318 such that the posts 316 and 318 are sandwiched between each pair of upper and lower blocks 330, 332 and 334, 336. The lower blocks 334 and 336 are supported on the ground surface 20 or truck bed 28, while the upper blocks 330 and 332 are supported on gussets 346 attached to each post 316 and 318.

Continuing with FIGS. 20-22, the upper and lower blocks 332 and 336 attached to the rear surface 344 of the posts 316 and 318 are configured to support the upper and lower suction manifolds 320 and 322. A central opening 348 is formed in each block 332 and 336 that is sized to conform to the shape of the suction manifolds 320 and 322. Thus, the central opening 348 may have a circular shape.

Each upper and lower block 332 and 336 comprises a removable top half 350 that provides access to a portion of the central opening 348. The suction manifolds 320 and 322 may be set or cradled within a stationary bottom half 352 of each block 332 and 336 and covered by the top half 350. The top half 350 is then secured to the stationary bottom half 352 using a plurality of fasteners 354. The fasteners 354 shown in FIGS. 20-22 are screws. In alternative embodiments, the fasteners 354 may comprise other fasteners known in the art such as threaded studs and nuts or bolts and nuts. Like the manifold assembly 70, the size of the central opening 348 is such that when the fasteners 354 are torqued to specification, the removeable top halves 350 will not vibrate loose during operation but will still allow each suction manifold 320 and 322 to rotate about and slide along its longitudinal axis within the blocks 332 and 336.

Similarly, the upper and lower blocks 330 and 334 attached to the front surface 342 of the posts 316 and 318 are configured to support the upper and lower discharge manifolds 326 and 328. A central opening 356 is formed in each block 330 and 334 that is sized to conform to the shape of the discharge manifolds 326 and 328. As will be discussed in more detail herein, each discharge manifold 326 and 328 has a rectangular cross-sectional shape. Thus, the central opening 356 may have a rectangular shape.

Each upper and lower block 330 and 334 comprises a removable top half 358 that may be secured to a stationary bottom half 360 using a plurality of fasteners 362. Like the suction manifolds 320 and 322, the discharge manifolds 326 and 328 may be cradled within a portion of the central opening 356 formed in the bottom half 360 and secured in place by attaching the top half 358 to the bottom half 360 using a plurality of fasteners 362. The fasteners 362 shown in FIGS. 20-22 are screws. In alternative embodiments, the fasteners 362 may comprise other fasteners known in the art such as threaded studs and nuts or bolts and nuts. As with the suction manifolds 320 and 322, the central opening 356 is sized such that when the fasteners 362 are torqued to specification, the removeable top halves 358 will not vibrate loose during operation but still allow relative movement of the discharge manifolds 326 and 328. Unlike the suction manifolds 320 and 322, the discharge manifolds 326 and 328 are only able to slide along their longitudinal axes and cannot rotate within the blocks 330 and 334.

Figure 23:
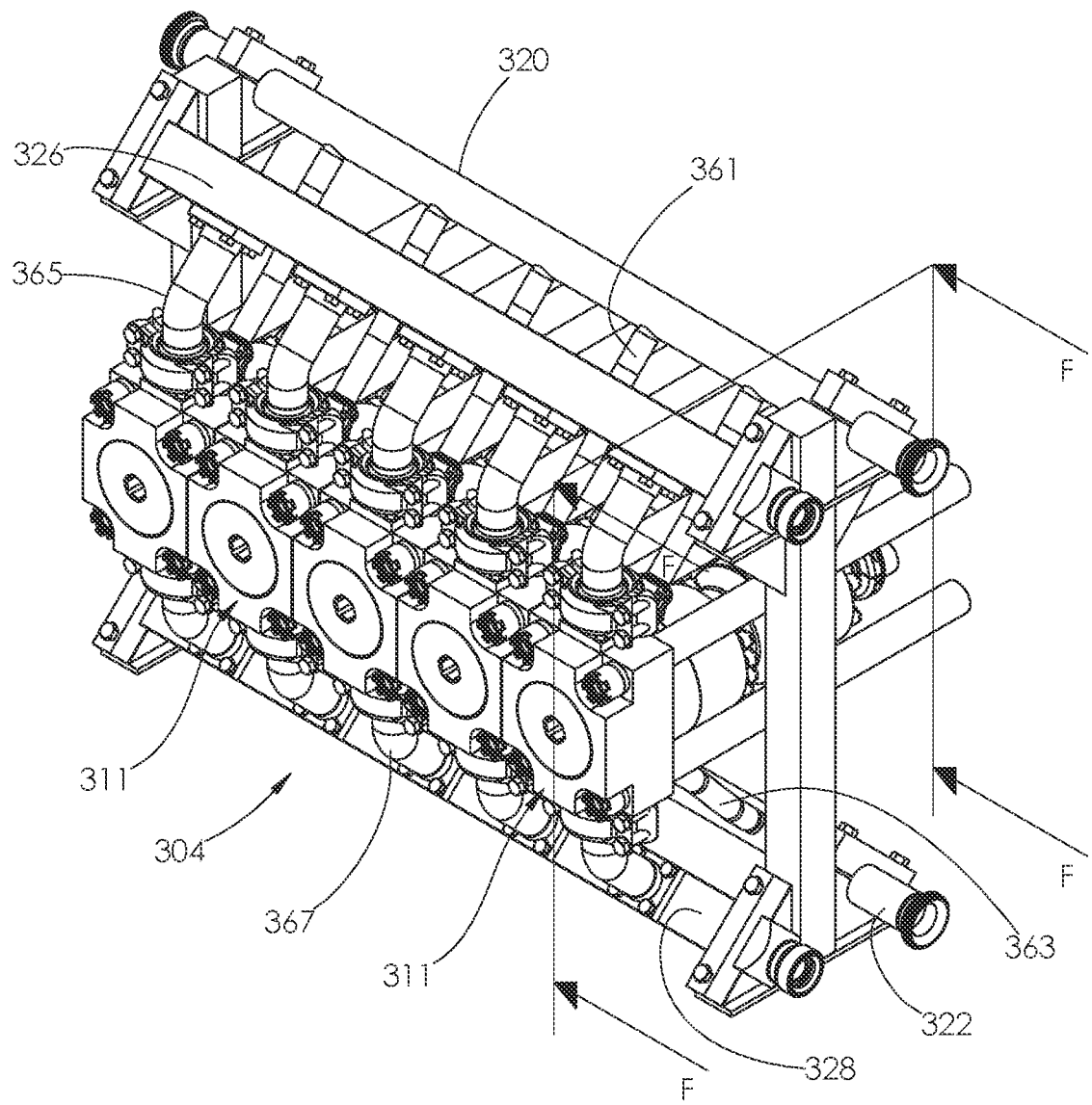
FIG. 23 is a front perspective view of the manifold assembly and fluid end shown in FIG. 18.

Turning to FIGS. 23 and 24, each fluid end section 311 comprises a housing 310 having upper and lower suction bores 364 and 366 and upper and lower discharge bores 461 and 463. A suction bore adapter 306 is installed within each suction bore 364 and 366. Likewise, a plurality of discharge bore adapters 308 are attached to the housing 310. Each adapter 308 is aligned with a corresponding one of the discharge bores 461 and 463. As will be described in more detail herein, each suction bore adapter 306 is configured to interlock with a corresponding suction conduit 361 or 363, and each discharge bore adapter 308 is configured to be clamped to a corresponding discharge conduit 365 or 367.

Figure 26:
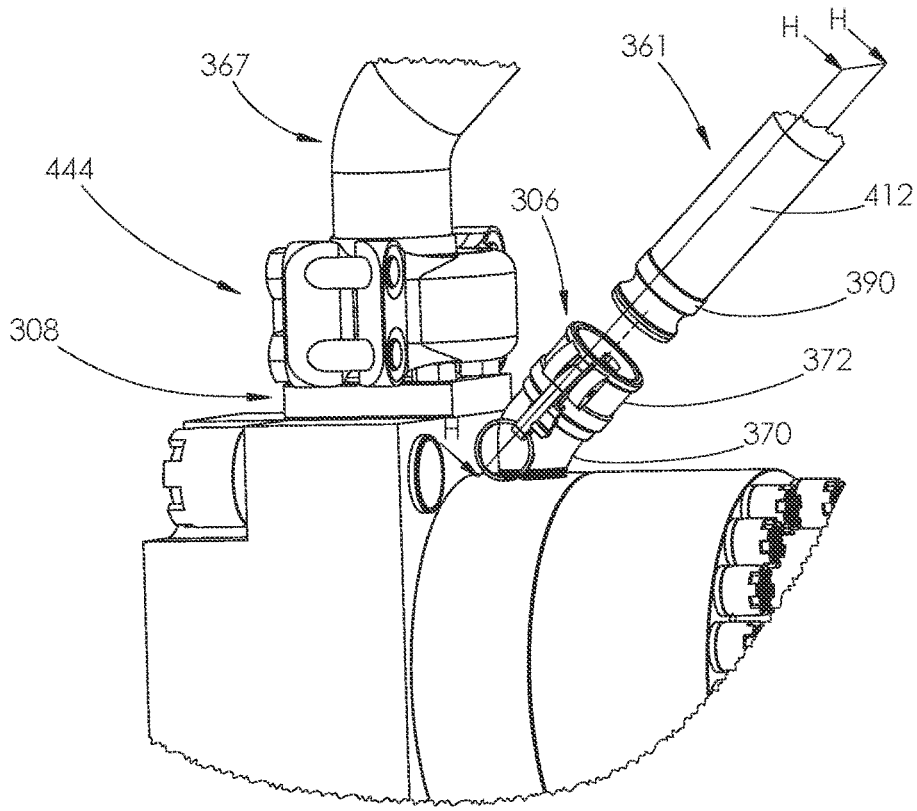
FIG. 26 is a rear perspective and partially exploded view of a portion of one of the fluid end sections and corresponding suction conduit shown in FIG. 23.
Figure 27:
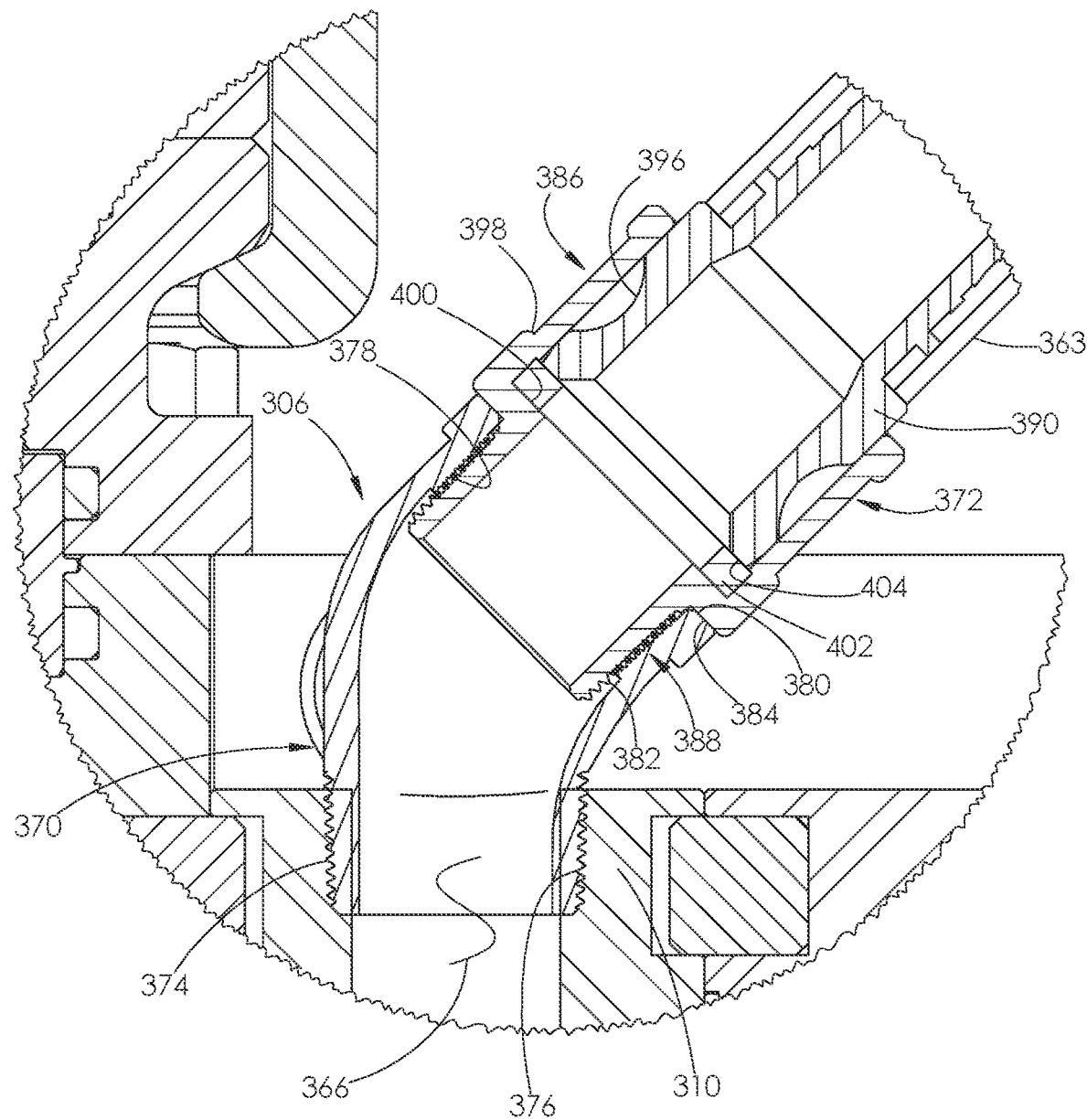
FIG. 27 is an enlarged view of area G, shown in FIG. 24.
Figure 28:
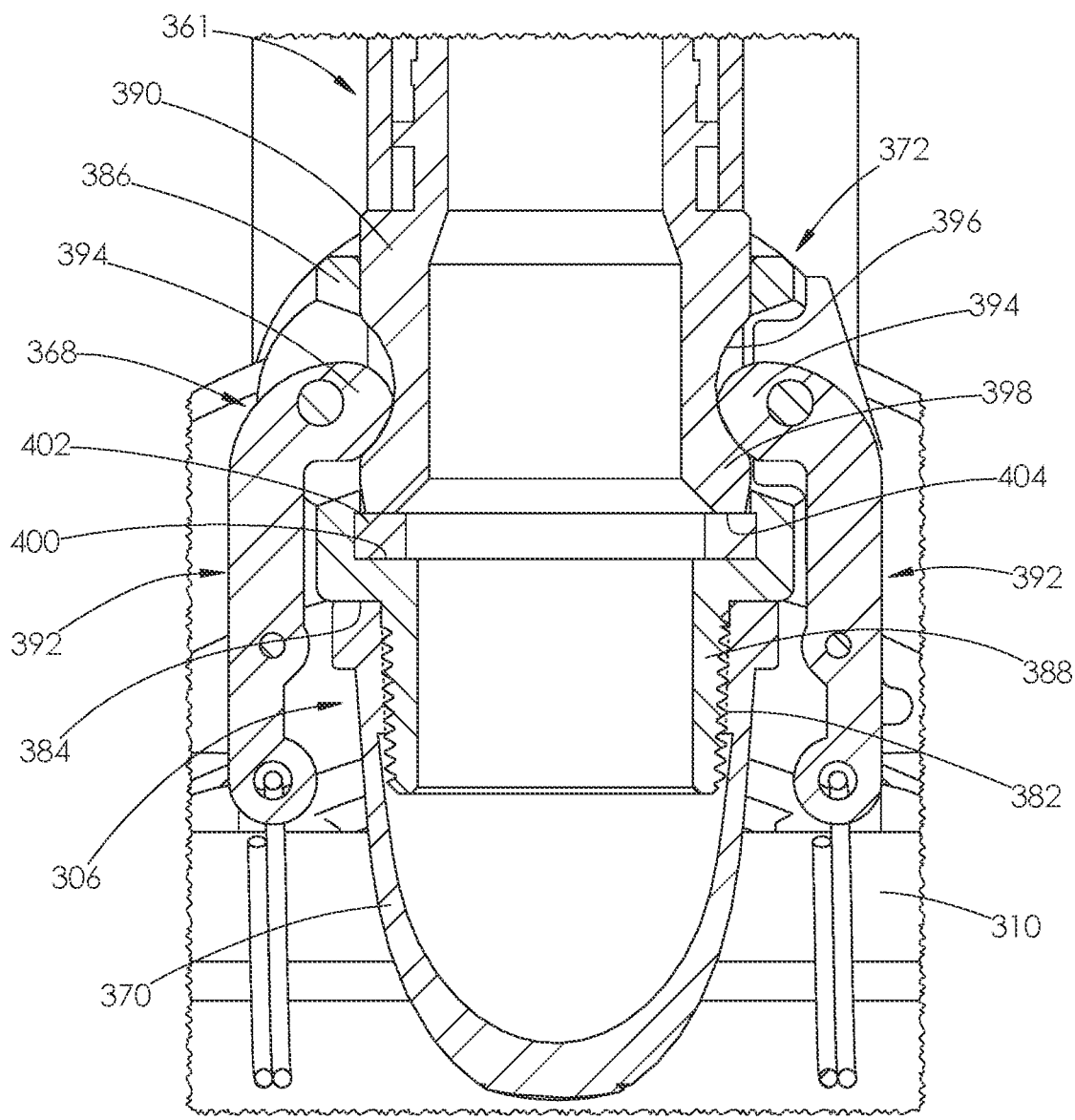
FIG. 28 is cross-sectional view of the suction conduit and suction bore adapter shown in FIG. 26, taken along H-H, but the components are shown in assembled form.

Turning now to FIGS. 26-28, in contrast to the bore adapters 128, the bore adapters 306 are configured for use with a camlock fitting 368, shown in FIG. 28, rather than the clamp 172, shown in FIG. 11. Each suction bore adapter 306 is made of metal and comprises a lower end 370 joined to an upper end 372. The lower end 370 is tubular and has a curved shape. The lower end 370 curves away from the discharge adapter 308 so as to provide space for assembly. As shown in FIG. 27, external threads 374 are formed on a portion of the lower end 370 for mating with internal threads 376 formed in the housing 310. The threads 374 and 376 are taper threads known in the in art and function as a seal to prevent fluid from leaking between the housing 310 and the adapter 306.

Internal threads 378 are also formed in the lower end 370 adjacent its end surface 380 for mating with external threads 382 formed on the upper end 372 of the adapter 306. When mated, the end surface 380 of the lower end 370 abuts a shoulder 384 formed in the outer surface of the upper end 372.

Continuing with FIG. 28, the upper end 372 of the adapter 306 functions as the coupler, or female end, of the camlock fitting 368, while a connection end 390 of each suction conduit 361 and 363 functions as the adapter, or male end, of the camlock fitting 368. The upper end 372 comprises upper portion 386 joined to a lower portion 388. The lower portion 388 carries the external threads 382 and mates with the lower end 370 of the adapter 306. The upper portion 386 comprises the shoulder 384 and is sized to receive the connection end 390 of the suction conduit 361 or 363. A pair of rotatable cam arms 392 are attached to the upper portion 386. Each cam arm 392 comprises a cam 394 that extends between outer and inner surfaces of the upper portion 386. Each cam 394 is configured to engage a groove 396 and a flange 398 formed in an outer surface of the connection end 390 of the suction conduit 361 or 363. The upper portion 386 further comprises an internal shoulder 400 supporting an annular seal 402.

During assembly, the cam arms 392 are lifted into an unlocked position, providing space for the connection end 390 to be installed within the upper portion 386 of the upper end 372. The connection end 390 further comprise an end surface 404. The connection end 390 is inserted into the upper portion 386 until its end surface 404 engages the seal 402. The cam arms 392 are then rotated such that each cam arm 392 engages the groove 396 and flange 398 formed in the connection end 390. The cam arms 392 are rotated until they are moved to a locked position, shown in FIG. 28.

When in the locked position, the cam arms 392 tightly secure the connection end 390 to the upper portion 386 of the upper end 372 of the adapter 306. When secured together, the end surface 404 of the connection end 390 compresses the seal 402 against the internal shoulder 400, thereby preventing any fluid from leaking between the mated components. To disassemble the connections, the cam arms 392 are rotated to an unlocked position, and the connection end 390 of the suction conduit 361 or 363 is pulled out of the adapter 306.

Figure 29:
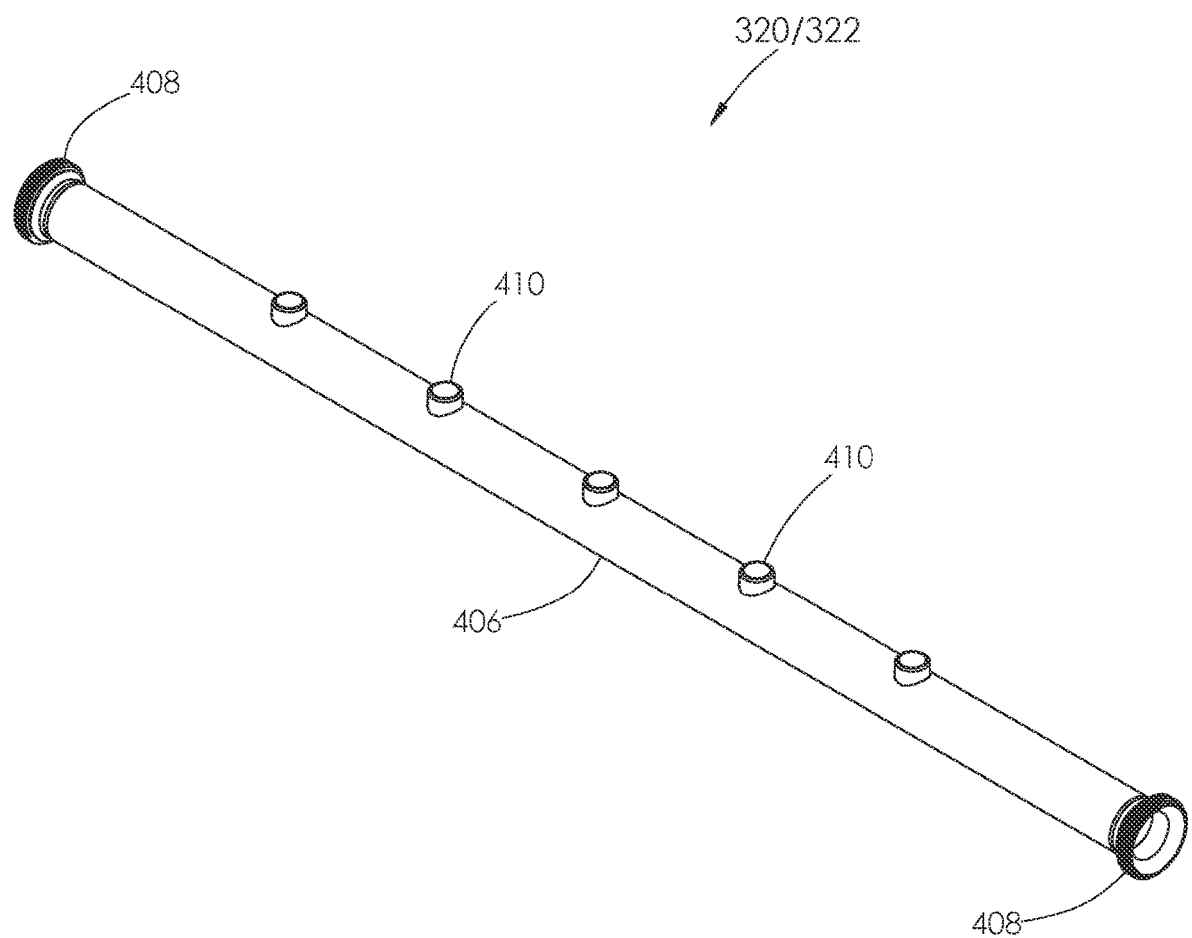
FIG. 29 is a perspective view of one of the suction manifolds shown in FIG. 18.
Figure 30:
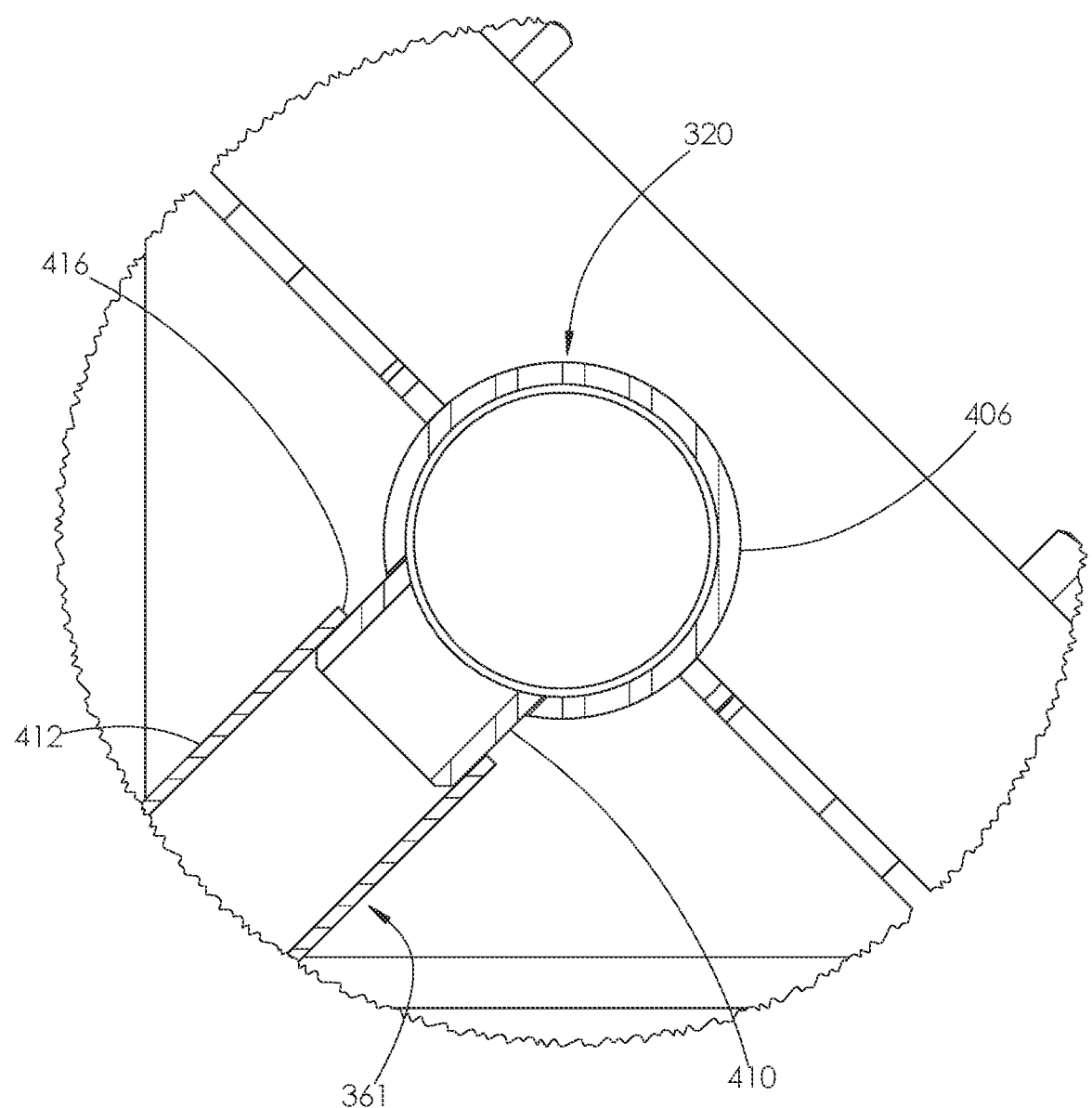
FIG. 30 is an enlarged view of area H, shown in FIG. 24.

Turning now to FIGS. 29 and 30, the upper and lower suction manifolds 320 and 322 are identical and each comprise a tubular body or flow tube 406 having opposed connection ends 408. The connection ends 408 are configured to mate with the intake piping system 32 shown in FIG. 2. Each manifold 320 and 322 further comprises a plurality of manifold adapters 410. In contrast to the manifold adapters 158, the manifold adapters 410 are not configured to receive a portion of a clamp 172. Instead, the manifold adapters 410 are configured so that each suction conduit 361 or 363 slides over a corresponding one of the adapters 410, as shown in FIG. 30.

Turning back to FIG. 20, in contrast to the suction conduits 86 and 88, the suction conduits 361 and 363 only comprise the single metal connection end 390 inserted within a tubular body 412. The tubular body 412 comprises an open end 416 opposite the connection end 390. Like the tubular body 166, the tubular body 412 is made of a flexible material and may be referred to as a "hose" or a "low-pressure hose". Like the manifold assembly 70, the suction manifolds 320 and 322 are installed within the frame 314 such that the suctions conduits 361 and 363 are positioned at about a 45-degree angle relative to the side posts 316 and 318.

Continuing with FIGS. 20 and 30, the connection end 390 comprises a barbed fitting 414, known in the art and shown in FIG. 20. The barbed fitting 414 is used to attach the connection end 390 to the tubular body 412. In alternative embodiments, the connection end 390 may be attached to the tubular body 412 using other means known in the art. As shown in FIG. 30, the open end 416 of the tubular body 412 is attached directly to a manifold adapter 410. The open end 416 is slid over the manifold adapter 410 and secured with a worm clamp known in the art, but not shown herein.

Like the manifold assembly 70, the suction conduits 361 and 363 are flexible and may bend and stretch as needed to properly attach each suction conduit 361 and 363 to each suction bore adapter 306. Such connections may be made quickly by simply rotating the cam arms 392 to a locked position on each cam lock fitting 368. Similarly, the connections may be quickly disassembled by rotating the cam arms 392 to an unlocked position. Like the suction conduits 86 and 88 and adapters 128 and 158, no threads are formed in the suction conduits 361 and 363 or the adapters 306 and 410 for mating with one another.

In alternative embodiments, the manifold adapters 410 and the corresponding end of the suction conduits 361 and 363 may be configured so as to function as a second cam lock fitting, if desired. In further alternative embodiments, the suction conduits 361 and 363 and manifold adapters 410 may be configured to be clamped together, like the suction conduits 86 and 88 and manifold adapters 158, shown in FIG. 13.

Figure 31:
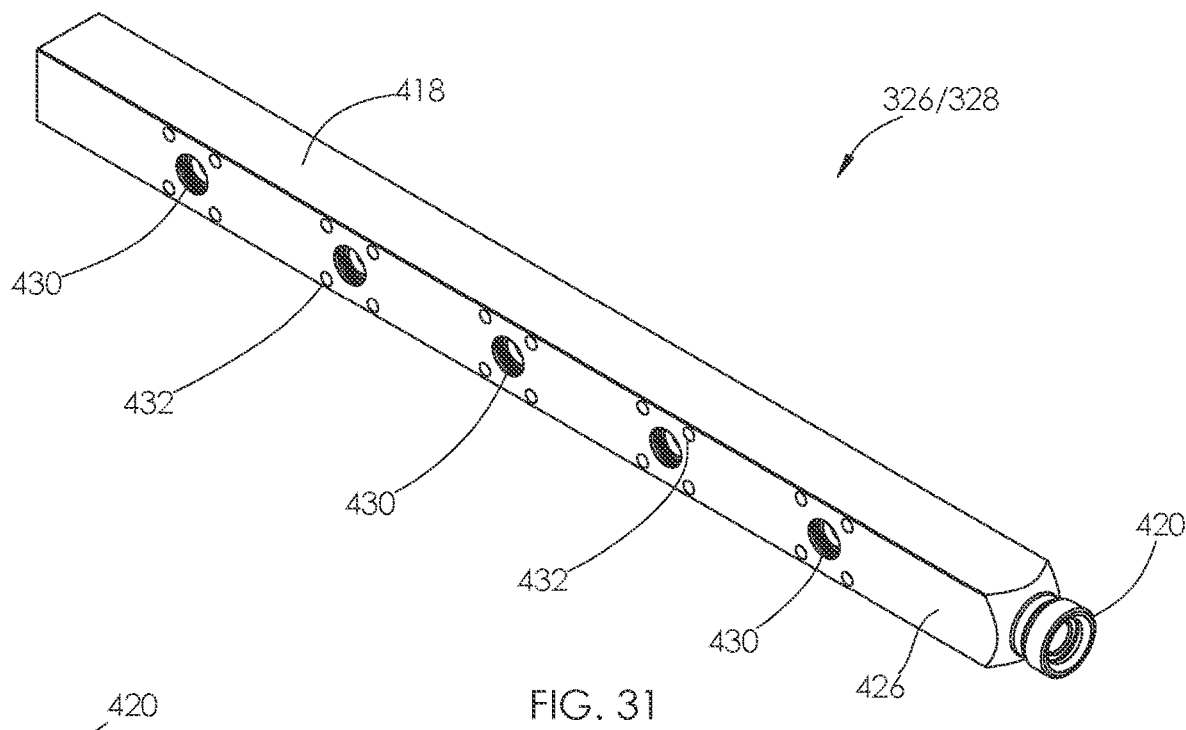
FIG. 31 is a front perspective view of one of the discharge manifolds shown in FIG. 18.
Figure 32:
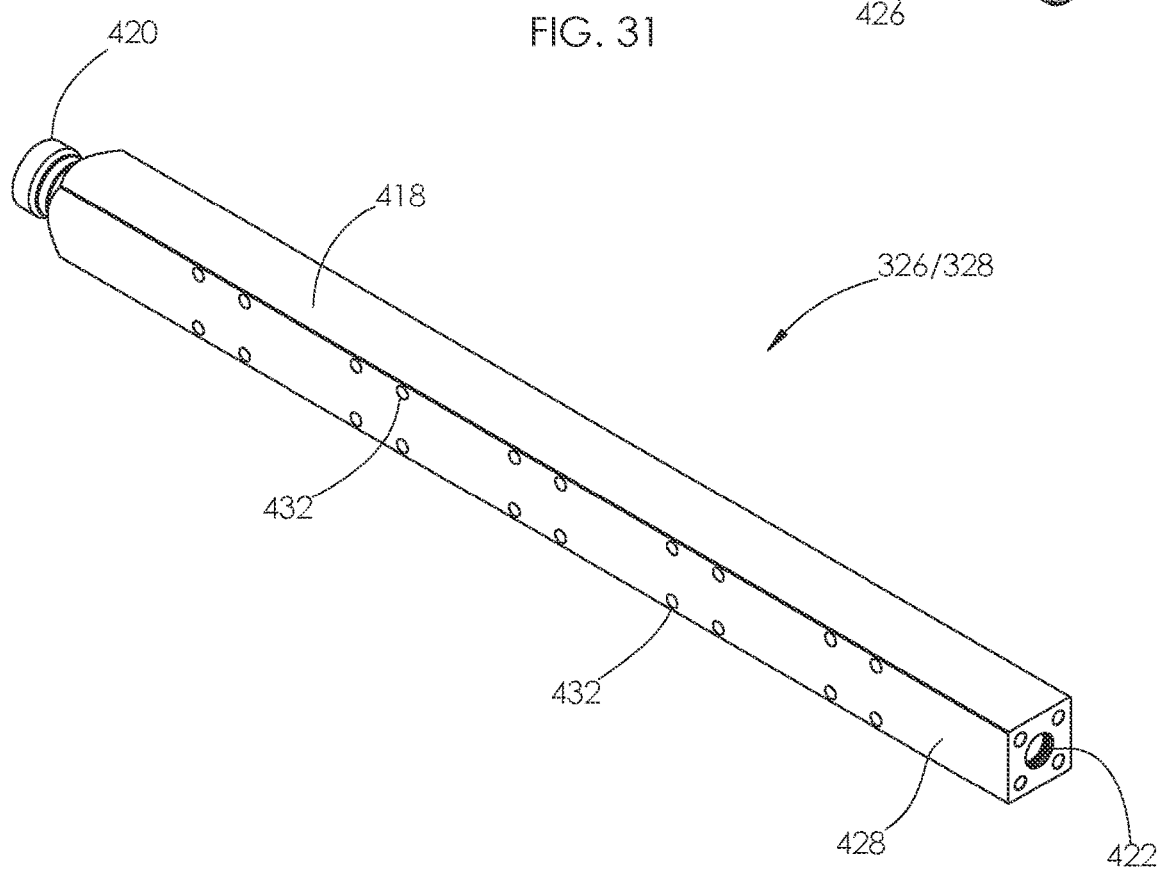
FIG. 32 is a rear perspective view of the discharge manifold shown in FIG. 31.
Figure 33:
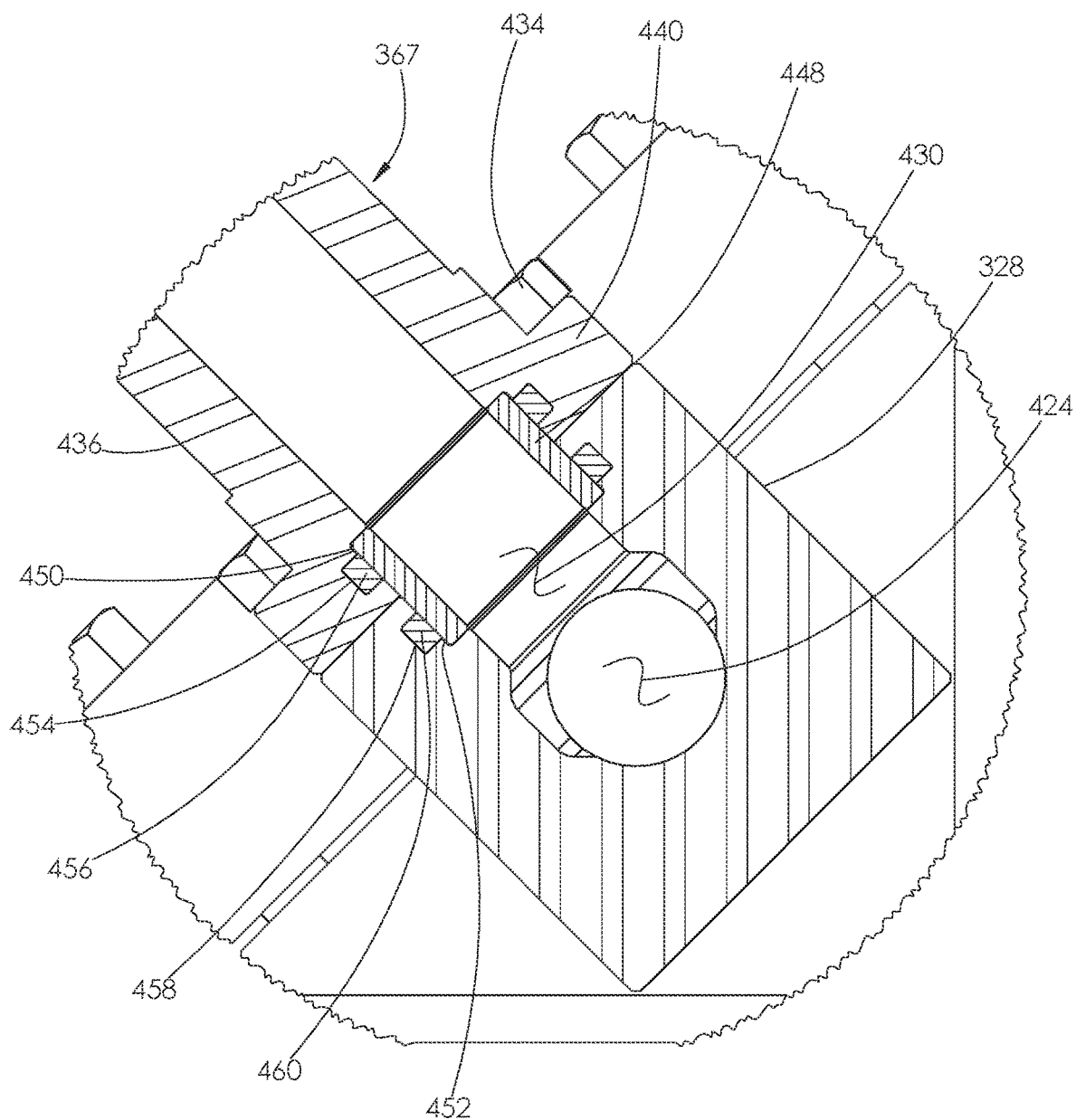
FIG. 33 is an enlarged view of area J, shown in FIG. 24.

Turning now to FIGS. 31-33, the upper and lower discharge manifolds 326 and 328 are identical and each comprise an elongate body 418 having opposed first and second connection ends 420 and 422. The ends 420 and 422 are interconnected by an internal flow passage 424, shown in FIG. 33. The first connection end 420 is configured to mate with the discharge piping system 33, shown in FIG. 2. The second connection end 422 is configured to mate with a component that seals the body 418 closed or may mate with the discharge piping system 33, shown in FIG. 2.

The elongate body 418 has a rectangular shape and opposed front and rear surfaces 426 and 428. A plurality of ports 430 are formed in the front surface 426 and are positioned at spaced-apart intervals. Each port 430 is surrounded by a plurality of threaded mounting holes 432, as shown in FIG. 31. The mounting holes 432 shown in FIGS. 31 and 32 extend through the body 418 and open on the rear surface 428, as shown in FIG. 32. The mounting holes 432 are configured to mate with fasteners 434 used to secure a discharge conduit 365 or 367 to the discharge manifolds 326 or 328 at each port 430, as shown in FIG. 33.

Turning back to FIG. 20, each discharge conduit 365 and 367 comprises a tubular body 436 having opposed first and second connection ends 438 and 440. The tubular body 436 is made of a flexible material and may be referred to as a "hose". For example, the tubular body 436 may be made of synthetic rubber reinforced by multiple layers of braided high tensile steel. Because the discharge conduits 365 and 367 carry higher pressure fluid than the suction conduits 361 and 363, the tubular body 436 may be made of a more durable flexible material than that of the suction conduits 361 and 363. Thus, the tubular body 436 may be referred to as a "high-pressure hose." The tubular body 436 may also be formed with a curved shape so that the discharge conduits 365 and 367 extend as needed between each fluid end section 311 and the discharge manifolds 326 and 328, as shown in FIG. 18.

Figure 34:
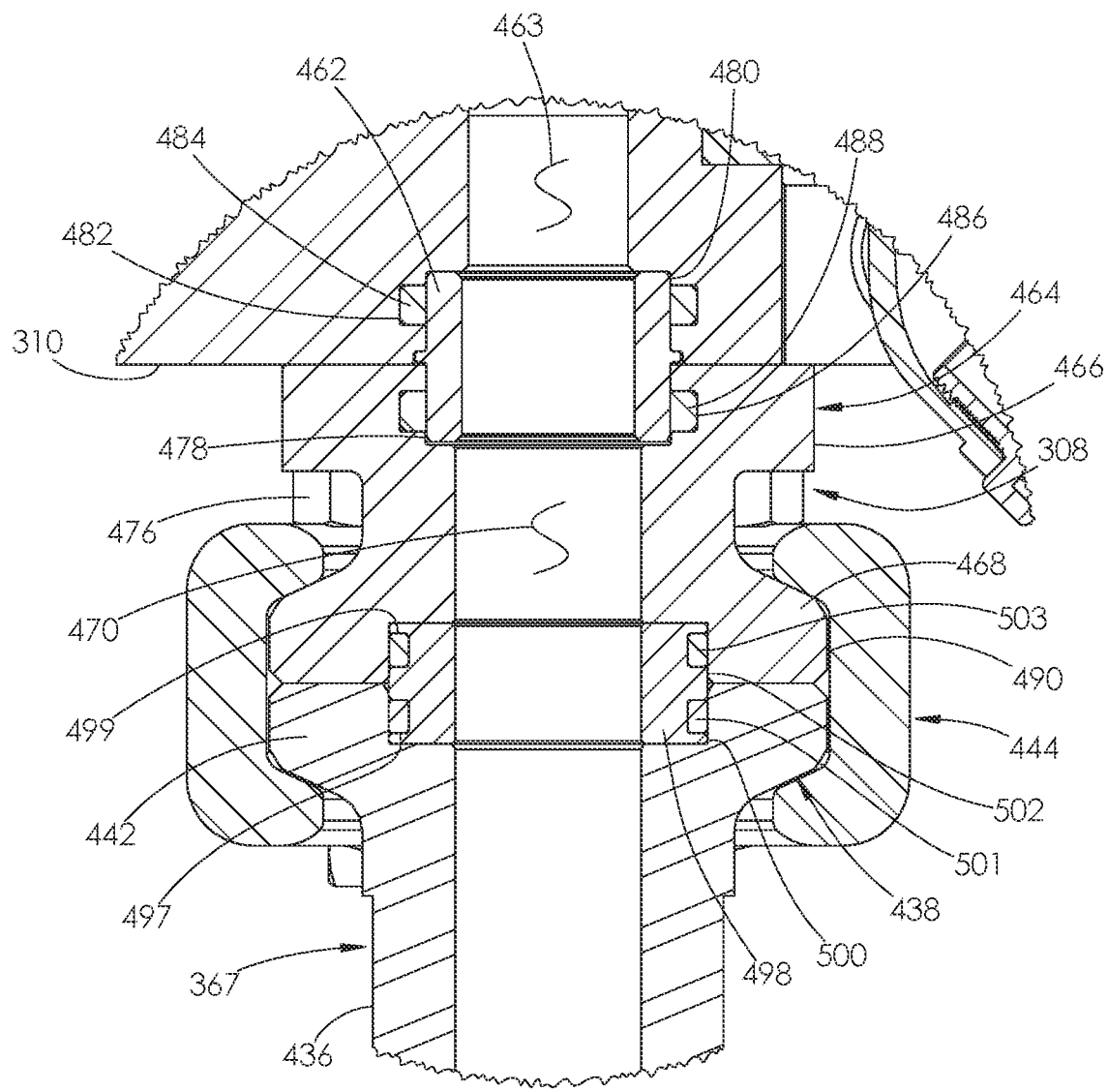
FIG. 34 is an enlarged view of area I, shown in FIG. 24.

With reference to FIGS. 33 and 34, the first and second connection ends 438 and 440 of each of the discharge conduits 365 and 367 are made of metal. While not shown in the FIGS. 33 and 34, the first and second connection ends 438 and 440 are separate pieces that may be bonded to the ends of the tubular body 436 using a specialized bonding procedure. The first connection end 438 comprises a flange 442 sized to mate with a portion of an opposing angle clamp 444. The second connection end 440 has a rectangular shape and comprises a plurality of mounting holes 445, shown in FIG. 20, configured to align with the threaded mounting holes 432 formed in the discharge manifold 326 or 328.

Continuing with FIG. 33, the second connection end 440 is attached to the discharge manifold 326 or 328 by installing the fastener 434 within each pair of aligned mounting holes formed in the connection end 440 and the threaded mounting holes 432. The fasteners 434 shown in FIG. 33 are screws. In alternative embodiments, other fasteners known in the art such as threaded studs and nuts or bolts and nuts may be used. When the second connection end 440 is attached to the manifold 326 or 328, the port 430 aligns with the interior of the tubular body 436 of the discharge conduit 365 or 367.

The second connection end 440 further comprises an inner adapter 448. A counterbore 450 is formed within the second connection end 440 that aligns with a like counterbore 452 formed in the walls of the manifold 326 or 328 surrounding the port 430. The inner adapter 448 has a ring shape and is installed within both counterbores 450 and 452 such that the inner adapter 448 spans between the second connection end 440 and the interior of the manifold 326 or 328. A groove 454 is formed within the walls of the second connection end 440 for receiving a seal 456 configured to engage an outer surface of the inner adapter 448. Likewise, a groove 458 is formed within the walls of the manifold 326 or 328 for receiving a seal 460 configured to engage an outer surface of the inner adapter 448. The seals 456 and 460 prevent fluid from leaking between the discharge manifolds 326 and 328 and the discharge conduits 365 and 367 during operation.

Continuing with FIG. 34, each discharge bore adapter 308 comprises an inner adapter 462 and a separate outer adapter 464. The outer adapter 464 comprises first and second connection ends 466 and 468 joined by a central fluid passage 470. The first connection end 466 has a rectangular shape and a plurality of mounting holes (not shown) configured to align with a plurality of threaded mounting holes (not shown) formed in the outer surface of the housing 310 and surrounding an opening of the discharge bore 461 or 463. The discharge bore adapter 308 is configured to be secured to the housing 310 by installing a fastener 476 within each aligned pair of mounting holes. The fastener 476 shown in FIG. 34 is a screw. In alternative embodiments, the fastener 476 may be a different type of fastener known in the art, such as a threaded stud and nut or bolt and nut.

Like the second connection end 440 of the discharge conduit 365 or 367, a counterbore 478 is formed within the first connection end 466 that aligns with a like counterbore 480 formed in the discharge bore 461 or 463. The inner adapter 462 has a ring shape and is installed within both counterbores 478 and 480 such that the inner adapter 462 spans between the discharge bore 461 or 463 and the discharge bore adapter 308. A groove 482 is formed within the walls of the housing 310 surrounding the discharge bore 461 or 463 for receiving a seal 484 configured to engage an outer surface of the inner adapter 462. Likewise, a groove 486 is formed within the walls of the discharge bore adapter 308 surrounding the central fluid passage 470 for receiving a seal 488 configured to engage an outer surface of the inner adapter 462. The seals 484 and 488 prevent fluid from leaking between the housing 310 and the adapter 308 during operation.

The opposed second connection end 468 of the discharge bore adapter 308 comprises a flange 490 that is sized and shaped identical to the flange 442 on the first connection end 438 of the discharge conduit 365 or 367. The flanges 490 and 442 may be brought together such that they abut and the central fluid passage 470 aligns with the interior of the tubular body 436.

Figure 25:
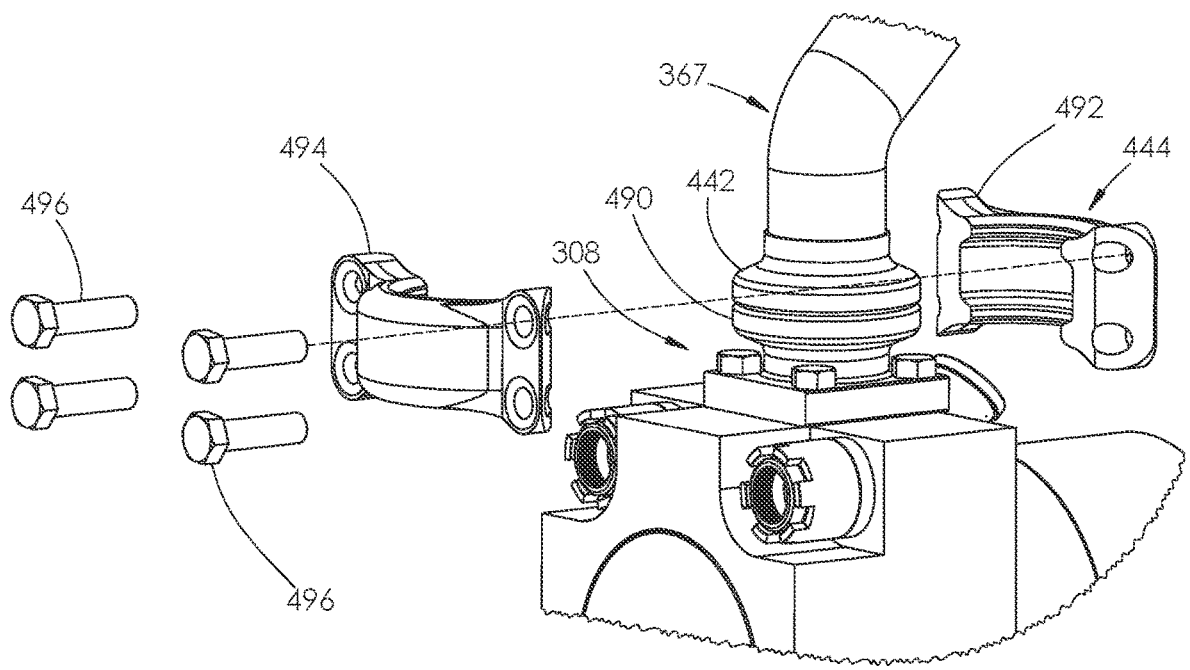
FIG. 25 is a front perspective and partially exploded view of a portion of one of the fluid end sections and corresponding discharge conduit shown in FIG. 23.

Continuing with FIGS. 25 and 34, the flanges 490 and 442 are secured together by the opposing angle clamp 444. The interior of the clamp 444 is sized to closely surround the mated flanges 490 and 442. The clamp 444 comprises a first side clamp 492 and second side clamp 494. The side clamps 492 and 494 are brought together around the flanges 490 and 442 and secured using a plurality of fasteners 496. The fasteners 496 shown in FIG. 25 are screws. In alternative embodiments, the fasteners 496 may be a different type of fastener known in the art, such as a threaded stud and nut or bolt and nut. The fastened clamp 444 tightly secures the connection ends 468 and 438 of the discharge bore adapter 308 and the discharge conduit 365 or 367 together, as shown in FIG. 34.

Continuing with FIG. 34, fluid is prevented from leaking between the connection ends 468 and 438 by a seal carrier 498 that spans between the mated connection ends 468 and 438. Two spaced-apart annular grooves 497 and 499 are formed in an outer surface of the seal carrier 498 for housing corresponding first and second annular seals 501 and 503. When the seal carrier 498 is installed within the connection ends 468 and 438, a portion of the seal carrier 448 and the first seal 501 are installed within a counterbore 500 formed in the first connection end 438 of the discharge conduit 365 or 367. Likewise, a portion of the seal carrier 498 and the second seal 503 are installed within a counterbore 502 formed in the second connection end 468 of the discharge bore adapter 308. The seals 501 and 503 engage the walls of the corresponding counterbores 500 and 502, thereby preventing fluid from leaking between the connection ends 468 and 438.

No threads are formed in the discharge conduit 365 or 367 or the discharge adapter 308 for mating with one another. If the discharge conduits 365 or 367 need to be removed from the fluid end 304, the clamps 444 are simply removed and the discharge conduits 365 or 367 pulled away from the discharge bore adapters 308.

Like the manifold assembly 70, in operation, the suction and discharge conduits 361, 363 and 365, 367, being less rigid than traditional metal pipe conduits, allow for the relative movement between the manifolds 320, 322 and 326, 328 and the pump 302. Likewise, limited movement of the manifolds 320, 322 and 326, 328 is permitted within the corresponding blocks 330, 332, 334, and 336. Allowing movement of the components transmits a minimal amount of force and vibration to the fluid end sections 311, thereby increasing the life and maintenance intervals of the components of the pump 302. Additionally, the modular nature of the manifold assembly 300 reduces maintenance costs, because each component is individually replaceable.

When the manifold assembly 300 is positioned around the fluid end 304, at least a portion of each fluid end section 311 extends past the front and rear surfaces 342 and 344 of each post 316 and 318, as shown in FIG. 18. Likewise, at least a portion of each stay rod 66 extends past the front and rear surfaces 342 and 344 of the posts 316 and 318. The posts 316 and 318 are positioned intermediate a front surface 504 of the fluid end 304 and the front surface 212 of the power end 64. A portion of the frame 314 may overlap with a portion of the base 214 of the power end 64.

Similar to the manifold assembly 300, alternative embodiments of the manifold assembly 300 may comprise only one suction manifold 320 or 322 or only one discharge manifold 326 or 328. The location of the manifolds may vary depending on the specific design of the fluid end. The manifold assembly 300 and corresponding adapters 306, 308, or 410 may also be configured for use with a single block fluid end, like that shown in the '765 Patent.

Even if not specifically shown in a figure, one or more features of the manifold assembly 70 may be used with the manifold assembly 300 and vice versa. The various components described herein may also vary in shape or size, as needed, to accommodate the size and shape of the fluid end used with the manifold assemblies 70 and 300.

One or more kits may also be useful for assembly of the manifolds assemblies 70 and 300. A kit may comprise the frame 71 or 314, the upper suction manifolds 82 or 320, the lower suction manifolds 84 or 322, the upper discharge manifold 326, the lower discharge manifold 328, the upper suction conduits 86 or 361, the lower suction conduits 88 or 363, the upper discharge conduits 365, and/or the lower discharge conduits 367. A kit may further comprise any one of the various components described herein.

The various features and alternative details of construction of the apparatuses described herein for the practice of the present technology will readily occur to the skilled artisan in view of the foregoing discussion. It is to be understood that even though numerous characteristics and advantages of various embodiments of the present technology have been set forth in the foregoing description, together with details of the structure and function of various embodiments of the technology, this detailed description is illustrative only. Changes may be made in detail, especially in matters of structure and arrangements of parts within the principles of the present technology to the full extent indicated by the broad general meaning of the terms in which the appended claims are expressed.

The invention claimed is:

1. A pump assembly, comprising:
a fluid end; and
a kit for use with the fluid end, the kit comprising:
  a first frame element having an upper end and a lower end;
  a second frame element having an upper end and a lower end;
  an upper suction manifold, configured for attachment to the upper end of the first frame element and the upper end of the second frame element;
  a lower suction manifold, configured for attachment to the lower end of the first frame element and the lower end of the second frame element;
  a plurality of first conduits, each of the plurality of first conduits supported by the upper suction manifold; and
  a plurality of second conduits, each of the plurality of second conduits supported by the lower suction manifold;
  wherein the plurality of first conduits and the plurality of second conduits are configured to be attached to the fluid end;
  wherein each of the plurality of first conduits and the plurality of second conduits are connected to the fluid end and the fluid end is disposed through a central opening, wherein the central opening is bounded by the first frame element, the second frame element, the upper suction manifold, and the lower suction manifold.

2. The pump assembly of claim 1, wherein the kit further comprises:
an upper discharge manifold, configured for attachment to the upper end of the first frame element and the upper end of the second frame element;
a lower discharge manifold, configured for attachment to the lower end of the first frame element and the lower end of the second frame element;
a plurality of third conduits, each of the plurality of third conduits supported by the upper discharge manifold; and
a plurality of fourth conduits, each of the plurality of fourth conduits supported by the lower discharge manifold;
wherein the plurality of third conduits and the plurality of fourth conduits are configured to be attached to the fluid end.

3. The pump assembly of claim 2, wherein least one conduit of the plurality of first conduits and at least one conduit of the plurality of second conduits is flexible.

4. The pump assembly of claim 2, wherein the kit further comprises:
a means for connecting one of the plurality of fourth conduits to the fluid end.

5. The pump assembly of claim 2, wherein each of the plurality of fourth conduits and each of the plurality of third conduits comprise a terminal flange; in which the kit further comprises:
a discharge bore adapter assembly comprising:
  an adapter having an internal bore and an external flange; and
  a clamp, sized to surround and join the external flange of the adapter and the terminal flange of one of the plurality of third conduits.

6. The pump assembly of claim 5, wherein the adapter is characterized as a first adapter; wherein the kit further comprises:
a second adapter configured to partially extend within the internal bore of the first adapter.

7. The pump assembly of claim 1, wherein the kit further comprises:
a means for connecting one of the plurality of second conduits to the fluid end.

8. The pump assembly of claim 1, wherein the kit further comprises:
a suction bore adapter assembly comprising:
  cam arms configured to engage with the plurality of second conduits; and
  a threaded end configured to attach to the fluid end.

9. The pump assembly of claim 8, wherein the cam arms of the suction bore adapter assembly are attached to at least one of the plurality of second conduits and the threaded end of the suction bore adapter assembly is attached to the fluid end.

10. The pump assembly of claim 1, in which the kit further comprises a clamp, wherein the clamp is configured to join the upper suction manifold to at least one of the plurality of first conduits.

11. The pump assembly of claim 1, wherein the kit further comprises:
a plurality of discharge conduits joined to form a discharge pathway; and
a discharge manifold in fluid communication with the discharge pathway.

12. The pump assembly of claim 1, further comprising:
a power end attached to the fluid end by a plurality of stay rods, wherein at least a portion of each of the plurality of stay rods is positioned within the central opening.

13. The pump assembly of claim 1, further comprising:
a plurality of discharge conduits joined to form a discharge pathway; and
a discharge manifold in fluid communication with the discharge pathway;
wherein the discharge manifold is not supported by the first frame element and is not supported by the second frame element.

14. The pump assembly of claim 1, further comprising:
at least one discharge manifold, wherein the at least one discharge manifold is supported by the first frame element and the second frame element; and
a plurality of third conduits extending from the fluid end to the at least one discharge manifold.

15. A pump assembly, comprising:
a fluid end; and
a kit, comprising:
  a first frame element having an upper end and a lower end;
  a second frame element having an upper end and a lower end;

an upper suction manifold, configured for attachment to the upper end of the first frame element and the upper end of the second frame element;
a lower suction manifold, configured for attachment to the lower end of the first frame element and the lower end of the second frame element;
a plurality of first conduits, each of the plurality of first conduits supported by the upper suction manifold;
a plurality of second conduits, each of the plurality of second conduits supported by the lower suction manifold;
an upper discharge manifold, configured for attachment to the upper end of the first frame element and the upper end of the second frame element;
a lower discharge manifold, configured for attachment to the lower end of the first frame element and the lower end of the second frame element;
a plurality of third conduits, each of the plurality of third conduits supported by the upper discharge manifold;
a plurality of fourth conduits, each of the plurality of fourth conduits supported by the lower discharge manifold; wherein each of the plurality of fourth conduits and each of the plurality of third conduits comprise a terminal flange; and
a discharge bore adapter assembly, comprising:
an adapter having an internal bore and an external flange; and
a clamp, sized to surround and join the external flange of the adapter and the terminal flange of one of the plurality of third conduits;
wherein the plurality of first conduits and the plurality of second conduits are configured to be attached to the fluid end;
wherein the plurality of third conduits and the plurality of fourth conduits are configured to be attached to the fluid end;
wherein each of the plurality of first conduits, the plurality of second conduits, the plurality of third conduits and the plurality of fourth conduits are connected to the fluid end and the fluid end is disposed through a central opening, wherein the central opening is bounded by the first frame element, the second frame element, the upper suction manifold, and the lower suction manifold.

16. The pump assembly of claim 15, wherein the adapter is fastened to the fluid end and the clamp joins the external flange of the adapter and the terminal flange of one of the plurality of third conduits.

17. A pump assembly, comprising:
a fluid end; and
a kit, comprising:
a first frame element having an upper end and a lower end;
a second frame element having an upper end and a lower end;
an upper suction manifold, configured for attachment to the upper end of the first frame element and the upper end of the second frame element;
a lower suction manifold, configured for attachment to the lower end of the first frame element and the lower end of the second frame element;
a plurality of first conduits, each of the plurality of first conduits supported by the upper suction manifold;
a plurality of second conduits, each of the plurality of second conduits supported by the lower suction manifold; and
a suction bore adapter assembly, comprising:
cam arms configured to engage with the plurality of second conduits; and
a threaded end configured to attach to the fluid end;
wherein the plurality of first conduits and the plurality of second conduits are configured to be attached to the fluid end;
wherein each of the plurality of first conduits and the plurality of second conduits are connected to the fluid end and the fluid end is disposed through a central opening, wherein the central opening is bounded by the first frame element, the second frame element, the upper suction manifold, and the lower suction manifold.

18. A kit for use with a fluid end, the kit comprising:
a first frame element having an upper end and a lower end;
a second frame element having an upper end and a lower end;
an upper suction manifold, configured for attachment to the upper end of the first frame element and the upper end of the second frame element;
a lower suction manifold, configured for attachment to the lower end of the first frame element and the lower end of the second frame element;
a plurality of first conduits, each of the plurality of first conduits supported by the upper suction manifold;
a plurality of second conduits, each of the plurality of second conduits supported by the lower suction manifold;
an upper discharge manifold, configured for attachment to the upper end of the first frame element and the upper end of the second frame element;
a lower discharge manifold, configured for attachment to the lower end of the first frame element and the lower end of the second frame element;
a plurality of third conduits, each of the plurality of third conduits supported by the upper discharge manifold;
a plurality of fourth conduits, each of the plurality of fourth conduits supported by the lower discharge manifold;
a means for connecting one of the plurality of first conduits to the fluid end;
a means for connecting one of the plurality of second conduits to the fluid end;
a means for connecting one of the plurality of third conduits to the fluid end; and
a means for connecting one of the plurality of fourth conduits to the fluid end;
wherein the plurality of first conduits, the plurality of second conduits, the plurality of third conduits, and the plurality of fourth conduits are configured to be attached to the fluid end.

* * * * *